US012783634B2

(12) United States Patent
Xu et al.

(10) Patent No.: US 12,783,634 B2
(45) Date of Patent: Nov. 3, 2026

(54) APPLICATION HANDOFF METHOD AND TERMINAL DEVICE

(71) Applicant: Honor Device Co., Ltd., Shenzhen (CN)

(72) Inventors: Jia Xu, Shenzhen (CN); Wei Zhang, Shenzhen (CN); Xinpeng Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 250 days.

(21) Appl. No.: 18/837,412

(22) PCT Filed: Sep. 18, 2023

(86) PCT No.: PCT/CN2023/119544
§ 371 (c)(1),
(2) Date: Mar. 26, 2025

(87) PCT Pub. No.: WO2024/067225
PCT Pub. Date: Apr. 4, 2024

(65) Prior Publication Data

US 2025/0384120 A1 Dec. 18, 2025

(30) Foreign Application Priority Data

Sep. 28, 2022 (CN) ......................... 202211193576.5

(51) Int. Cl.
*G06F 21/44* (2013.01)

(52) U.S. Cl.
CPC .................................... *G06F 21/44* (2013.01)

(58) Field of Classification Search
CPC .......... G06F 21/44; G06F 21/10; G06F 21/64; G06F 9/445; G06F 9/54; H04L 63/0876; H04L 67/148; H04W 12/06
See application file for complete search history.

(56) References Cited

U.S. PATENT DOCUMENTS

2009/0216728 A1* 8/2009 Brainerd ............... G06F 16/248
2018/0359244 A1* 12/2018 Cockerill ............. H04L 63/105
(Continued)

FOREIGN PATENT DOCUMENTS

CN 108809495 A 11/2018
CN 111447323 A 7/2020
(Continued)

OTHER PUBLICATIONS

3GPP TR 38.824 V16.0.0 (Mar. 2019), 3rd Generation Partnership Project, Technical Specification Group Radio Access Network, Study on physical layer enhancements for NR ultra-reliable and low latency case (URLLC), total 78 pages.
(Continued)

*Primary Examiner* — Sangseok Park
(74) *Attorney, Agent, or Firm* — WOMBLE BOND DICKINSON (US) LLP

(57) ABSTRACT

Embodiments of this application provide an application handoff method and a terminal device. The method includes: A second terminal device receives a broadcast handoff notification from a first terminal device, where the broadcast handoff notification is used to request to hand off a first handoff application on the first terminal device to the second terminal device; the second terminal device determines a second handoff application based on the broadcast handoff notification, and performs validity authentication and matching relationship verification on the second handoff application, to obtain a validity authentication result and a matching relationship verification result; and the second terminal device displays a handoff contact point of the second handoff application when the validity authentication result is that the validity authentication succeeds, and the matching relationship verification result is that the matching relationship verification succeeds.

18 Claims, 29 Drawing Sheets

(56) References Cited

U.S. PATENT DOCUMENTS

| | | | | |
|---|---|---|---|---|
| 2019/0149972 | A1* | 5/2019 | Parks | G06F 9/4856 709/204 |
| 2020/0159378 | A1 | 5/2020 | Das | |
| 2023/0179698 | A1 | 6/2023 | Xi et al. | |
| 2024/0192986 | A1 | 6/2024 | Wang | |

FOREIGN PATENT DOCUMENTS

| | | | |
|---|---|---|---|
| CN | 112291764 | A | 1/2021 |
| CN | 112351412 | A | 2/2021 |
| CN | 113311975 | A | 8/2021 |
| CN | 113645622 | A | 11/2021 |
| CN | 114189318 | A | 3/2022 |
| CN | 114924671 | A | 8/2022 |

OTHER PUBLICATIONS

3GPP TS 38.214 V17.3.0 (Sep. 2022), 3rd Generation Partnership Project, Technical Specification Group Radio Access Network, NR, Physical layer procedures for data, total 232 pages.

* cited by examiner

CONT. FROM FIG. 6A

TO FIG. 6C

CONT.
FROM

CONT. FROM FIG. 6C

TO

CONT. FROM FIG. 14A

TO FIG. 14C

CONT. FROM FIG. 14B

APPLICATION HANDOFF METHOD AND TERMINAL DEVICE

CROSS-REFERENCE TO RELATED APPLICATIONS

This application is a national stage of International Application No. PCT/CN2023/119544, filed on Sep. 18, 2023, which claims priority to Chinese Patent Application No. 202211193576.5, filed on Sep. 28, 2022. The disclosures of both of the aforementioned applications are hereby incorporated by reference in their entireties.

TECHNICAL FIELD

This application relates to the field of terminal technologies, and in particular, to an application handoff method and a terminal device.

BACKGROUND

In a multi-device scenario, terminal devices are classified into a source device and a peer device. The source device is a transmit end device, and the peer device is a receive end device. When a same account is logged in on the source device and the peer device, and the source device and the peer device are located in a same local area network, if a handoff condition is triggered by a user, applications on the source device and the peer device may be handed off. For example, the source device is a computer, the peer device is a mobile phone, the user logs in to a same account on the computer and the mobile phone, and the computer and the mobile phone are located in a same local area network. If the user plays a video in video playback software on the computer, video playback software on the mobile phone of the user can synchronously play the video. If the user is editing text on the computer, the text being edited can be synchronously displayed on the mobile phone of the user.

However, in an application handoff process, for an application, content in an application on the source device may be handed off to an application with an unreliable trust source on the peer device, resulting in disclosure of user information. For example, the mobile phone hands off content in Notepad to Notepad on a tablet computer. If Notepad on the tablet computer is a forged application, information edited by the user is stolen by the forged application. Therefore, currently, an application handoff method needs to be provided, to avoid handing off content in an application to an application with an unreliable trust source, and improve application handoff security.

SUMMARY

Embodiments of this application provide an application handoff method and a terminal device, to avoid handing off content in an application to an application with an unreliable trust source, and improve application handoff security, so as to improve user experience.

According to a first aspect, an application handoff method is provided, and is applied to a system including a first terminal device, a second terminal device, and a cloud server. A user logs in to a same account on the first terminal device and the second terminal device, and the first terminal device and the second terminal device are located in a same local area network. The method includes: The second terminal device receives a broadcast handoff notification from the first terminal device, where the broadcast handoff notification is used to request to hand off a first handoff application on the first terminal device to the second terminal device; the second terminal device determines a second handoff application based on the broadcast handoff notification, and performs validity authentication and matching relationship verification on the second handoff application, to obtain a validity authentication result and a matching relationship verification result; and the second terminal device displays a handoff contact point of the second handoff application when the validity authentication result is that the validity authentication succeeds, and the matching relationship verification result is that the matching relationship verification succeeds.

According to the application handoff method in this embodiment of this application, validity authentication and matching relationship verification are performed on the second handoff application on the second terminal device, and when both the validity authentication and the matching relationship verification succeed, the handoff contact point of the second handoff application is displayed on the second terminal device, to avoid handing off content in an application to an application with an unreliable trust source, and improve application handoff security, so as to improve user experience.

With reference to the first aspect, in some implementations of the first aspect, the broadcast handoff notification includes an application identifier APPID of the first handoff application and a handoff policy; the handoff policy includes at least one of the following: a handoff status identifier, a package name or a process name of at least one target handoff application, a device type of the at least one target handoff application, an application market release policy of the at least one target handoff application, and a minimum version that supports handoff; and the at least one target handoff application includes the second handoff application.

It should be understood that the handoff status identifier may be a flag bit used to identify a handoff policy status. For example, when the flag bit is 0, it may indicate that handoff is not supported, when the flag bit is 1, it may indicate application handoff, and when the flag bit is 3, it may indicate browser handoff. It may be understood that a specific value of the flag bit may be arbitrarily set, provided that different statuses can be distinguished. This is not specifically limited in this embodiment of this application.

It should be further understood that if the first handoff application is an application on an Android platform, the handoff policy includes a package name of the first handoff application on the Android platform; or if the first handoff application is an application on a Windows platform, the handoff policy includes a process name that is of the first handoff application on the Windows platform and that indicates that handoff can be performed.

The application market release policy may be any one of the following: not released, an overseas application market 1, a domestic application market 1, a domestic application market 2, and an overseas application market 2.

The minimum version that supports application handoff may be represented by a minimum version number that supports application handoff, and is used to indicate a minimum version existing when the second handoff application can be handed off.

With reference to the first aspect, in some implementations of the first aspect, that the second terminal device determines a second handoff application based on the broadcast handoff notification includes: The second terminal device determines an application that is in the at least one target handoff application and that is of a same device type as the second terminal device as the second handoff application based on the device type of the at least one target handoff application.

With reference to the first aspect, in some implementations of the first aspect, the performing validity authentication on the second handoff application includes: The second terminal device sends a validity authentication request to the cloud server, where the validity authentication request carries an APPID of the second handoff application; the second terminal device receives cloud identification information of the second handoff application from the cloud server, where the cloud identification information includes a package name and/or a signature of the second handoff application that are/is stored in the cloud server; and the second terminal device compares the cloud identification information with local identification information of the second handoff application, to obtain the validity authentication result, where the local identification information is a package name and/or a signature of the second handoff application that are/is locally stored in the second terminal device.

With reference to the first aspect, in some implementations of the first aspect, the performing matching relationship verification on the second handoff application includes: The second terminal device sends a matching relationship query request to the cloud server, where the matching relationship query request carries the APPID of the second handoff application; the second terminal device receives a first matching relationship from the cloud server, where the first matching relationship is used to indicate at least one application capable of being handed off with the second handoff application; and the second terminal device determines, based on the first matching relationship, whether the at least one application includes the first handoff application, to obtain the matching relationship verification result.

It should be understood that when the at least one application that has a matching relationship with the second handoff application includes the first handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

With reference to the first aspect, in some implementations of the first aspect, the performing matching relationship verification on the second handoff application includes: The second terminal device sends a matching relationship query request to the cloud server, where the matching relationship query request carries the APPID of the first handoff application; the second terminal device receives a first matching relationship from the cloud server, where the first matching relationship is used to indicate at least one application capable of being handed off with the first handoff application; and the second terminal device determines, based on the first matching relationship, whether the at least one application includes the second handoff application, to obtain the matching relationship verification result.

It should be understood that when the at least one application that has a matching relationship with the first handoff application includes the second handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

With reference to the first aspect, in some implementations of the first aspect, the performing matching relationship verification on the second handoff application includes: The second terminal device obtains a second matching relationship, where the second matching relationship is used to indicate at least one application capable of being handed off with the second handoff application, and the second matching relationship is locally stored in advance when the second handoff application is installed on the second terminal device; and the second terminal device determines, based on the second matching relationship, whether the at least one application includes the first handoff application, to obtain the matching relationship verification result.

It should be understood that if an application developer predefines a matching relationship (that is, the second matching relationship) between the second handoff application and another application in an installation package of the second handoff application, when the second handoff application is installed, the second terminal device parses the installation package of the second handoff application to obtain the second matching relationship, and stores the second matching relationship in a system registration manager.

Specifically, when the at least one application that has a matching relationship with the second handoff application includes the first handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

With reference to the first aspect, in some implementations of the first aspect, the method further includes: The second terminal device sends a handoff data request message to the first terminal device in response to a tap operation performed by the user on the handoff contact point; and the second terminal device receives handoff data from the first terminal device, and displays the handoff data.

According to a second aspect, this application provides a terminal device, configured to perform the method in any one of the possible implementations of the first aspect. Specifically, the terminal device includes a module configured to perform the method in any one of the possible implementations of the first aspect.

In a design, the terminal device may include modules in a one-to-one correspondence with the methods/operations/steps/actions described in the foregoing aspects. The module may be a hardware circuit, may be software, or may be implemented by a combination of a hardware circuit and software.

In another design, the terminal device is a communication chip, and the communication chip may include an input circuit or interface configured to send information or data, and an output circuit or interface configured to receive information or data.

In another design, the terminal device is a communication device, and the communication device may include a transmitter configured to send information or data and a receiver configured to receive information or data.

According to a third aspect, a terminal device is provided and includes a processor and a memory. The processor is configured to read instructions stored in the memory, and may receive a signal through a receiver, and transmit a signal through a transmitter, to perform the method in any one of the possible implementations of the first aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated on a same chip, or may be respectively disposed on different chips. A type of the memory and a manner of disposing the memory and the processor are not limited in embodiments of this application.

It should be understood that a related data exchange process, for example, sending of handoff data request information, may be a process of outputting indication information from the processor, and receiving of capability information may be a process of receiving input capability information by the processor. Specifically, data output by the processor may be output to the transmitter, and input data received by the processor may be from the receiver. The transmitter and the receiver may be collectively referred to as a transceiver.

The terminal device in the third aspect may be a chip, and the processor may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

According to a fourth aspect, a computer program product is provided. The computer program product includes a computer program (which may also be referred to as code or instructions). When the computer program is run, a computer is enabled to perform the method in any one of the possible implementations of the first aspect.

According to a fifth aspect, a computer-readable storage medium is provided. The computer-readable storage medium stores a computer program (which may also be referred to as code or instructions). When the computer program is run on a computer, the computer is enabled to perform the method in any one of the possible implementations of the first aspect.

DESCRIPTION OF EMBODIMENTS

The following describes the technical solutions in this application with reference to the accompanying drawings.

In the embodiments of this application, words such as "first" and "second" are used to distinguish between same items or similar items with basically the same functions and effects. A person skilled in the art may understand that the words such as "first" and "second" do not limit a quantity and an execution sequence, and the words such as "first" and "second" do not indicate a definite difference.

It should be noted that the words such as "example" or "for example" in the embodiments of this application are used to indicate an example, an illustration, or a description. Any embodiment or design solution described as an "example" or "for example" in this application should not be explained as being more preferred or having more advantages than other embodiments or design solutions. Exactly, the words such as "example" or "for example" are used to present related concepts in a specific manner.

In the embodiments of this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually indicates an "or" relationship between associated objects. "At least one of the following items" or a similar expression thereof means any combination of these items, including a single item or any combination of a plurality of items. For example, at least one of a, b, or c may represent a, b, c, a and b, a and c, b and c, or a, b, and c, where a, b, and c may be singular or plural.

In a multi-device scenario, terminal devices are classified into a source device and a peer device. The source device is a transmit end device, and the peer device is a receive end device. When a same account is logged in on the source device and the peer device, and the source device and the peer device are located in a same local area network, if a handoff condition is triggered by a user, applications on the source device and the peer device may be handed off. For example, the source device is a computer, the peer device is a mobile phone, the user logs in to a same account on the computer and the mobile phone, and the computer and the mobile phone are located in a same local area network. If the user plays a video in video playback software on the computer, video playback software on the mobile phone of the user can synchronously play the video. If the user is editing text on the computer, the text being edited can be synchronously displayed on the mobile phone of the user.

Figure 1:
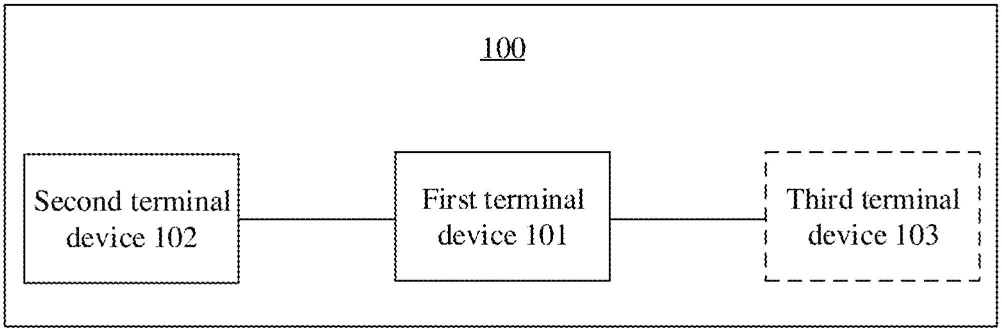
FIG. 1 is a schematic diagram of an application scenario according to an embodiment of this application.

For ease of understanding of this application, the following describes an application scenario of the embodiments of this application with reference to FIG. 1.

FIG. 1 is a schematic diagram of an application scenario 100 according to an embodiment of this application. The application scenario includes a first terminal device 101 and a second terminal device 102. The first terminal device 101 may be used as a source device, and the second terminal device 102 may be used as a peer device. When a user logs in to a same account on the first terminal device 101 and the second terminal device 102, and the first terminal device 101 and the second terminal device 102 are located in a same local area network, the first terminal device 101 may hand off content in an application program to the second terminal device 102.

Optionally, the application scenario 100 further includes a third terminal device 103. The third terminal device 103 may also be used as a peer device. When the user also logs in to the same account on the third terminal device 103, and the first terminal device 101 and the third terminal device 103 are located in a same local area network, the first terminal device 101 may hand off the content in the application program to the third terminal device 103.

It should be understood that in a scenario in which an application is handed off among a plurality of device, there may be one or more peer devices (that is, receive ends). This is not limited in this embodiment of this application.

It should be further understood that the plurality of peer devices are not required to be located in a same local area network as the source device in this application. For example, the first terminal device 101 and the second terminal device 102 may be located in one local area network (for example, WiFi), the first terminal device 101 and the third terminal device 103 may be located in another local area network (for example, Bluetooth), and the first terminal device 101 may separately hand off the content in the application program to the second terminal device 102 and the third terminal device 103.

To better understand the terminal device in the embodiments of this application, the following describes a hardware structure of the terminal device in the embodiments of this application.

Figure 2:
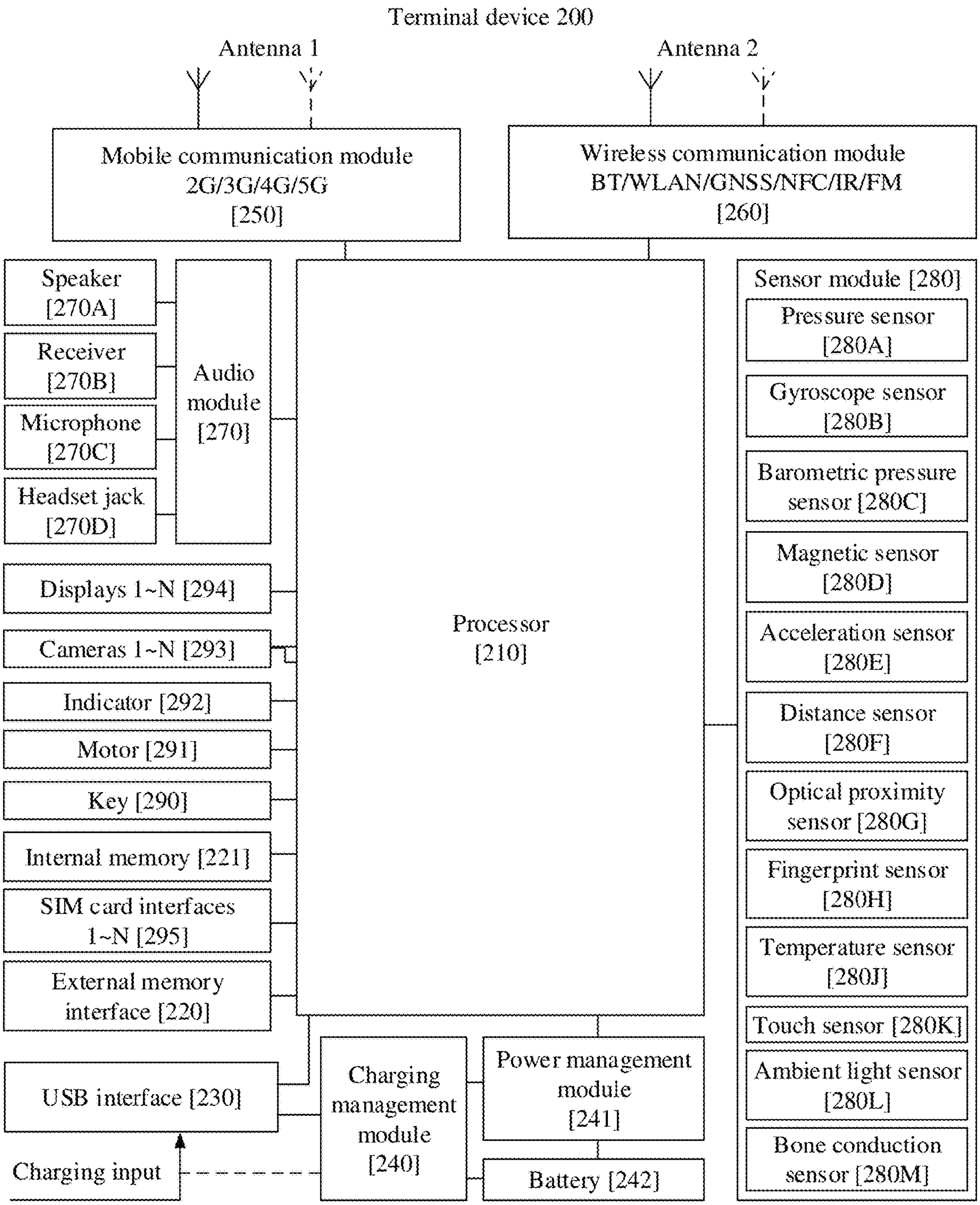
FIG. 2 is a schematic diagram of a structure of a terminal device according to an embodiment of this application.

FIG. 2 is a schematic diagram of a structure of a terminal device 200.

The terminal device may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of this application does not constitute a specific limitation on the terminal device. In some other embodiments of this application, the terminal device may include more or fewer components than those shown in the figure, some components may be combined, some components may be split, or a different component arrangement may be used. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a timing signal, to complete control of instruction fetching and instruction execution.

A memory may be further disposed in the processor 210 to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces a waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment of this application is merely an example for description and does not constitute a limitation on the structure of the terminal device. In some other embodiments of this application, the terminal device may alternatively use an interface connection manner different from that in the foregoing embodiment, or use a combination of a plurality of interface connection manners.

The terminal device implements a display function by using the GPU, the display 294, the application processor, and the like. The GPU is a microprocessor for image processing, and is connected to the display 294 and the application processor. The GPU is configured to perform mathematical and geometric computing for graphics rendering. The processor 210 may include one or more GPUs that execute program instructions to generate or change displayed information.

The terminal device may implement a photographing function by using the ISP, the camera 293, the video codec, the GPU, the display 294, the application processor, and the like.

The external memory interface 220 may be configured to be connected to an external memory card, for example, a Micro SD card, to expand a storage capability of the terminal device. The external memory card communicates with the processor 210 through the external memory interface 220 to implement a data storage function, for example, to store files such as music and a video in the external memory card.

The internal memory 221 may be configured to store computer-executable program code, and the executable program code includes instructions. The internal memory 221 may include a program storage area and a data storage area. The program storage area may store an operating system, an application program required by at least one function (for example, a sound play function and an image play function), and the like. The data storage area may store data (for example, audio data and an address book) created during use of the terminal device, and the like. In addition, the internal memory 221 may include a high-speed random access memory, and may further include a nonvolatile memory, for example, at least one magnetic disk storage device, a flash memory device, or a universal flash storage (universal flash storage, UFS). The processor 210 performs various functional applications and data processing of the terminal device by running instructions stored in the internal memory 221 and/or instructions stored in the memory disposed in the processor. For example, the application handoff method in the embodiments of this application may be performed.

The terminal device in this application may be used as a source device, or may be used as a peer device. The source device may also be referred to as a transmit end, and the peer device may also be referred to as a receive end. A software system of the terminal device may use a layered architecture, an event-driven architecture, a microkernel architecture, a micro-service architecture, or a cloud architecture. In this embodiment of this application, in FIG. 3A and FIG. 3B, an Android system with the layered architecture is used as an example to describe software structures of the transmit end and the receive end.

Figure 3A:
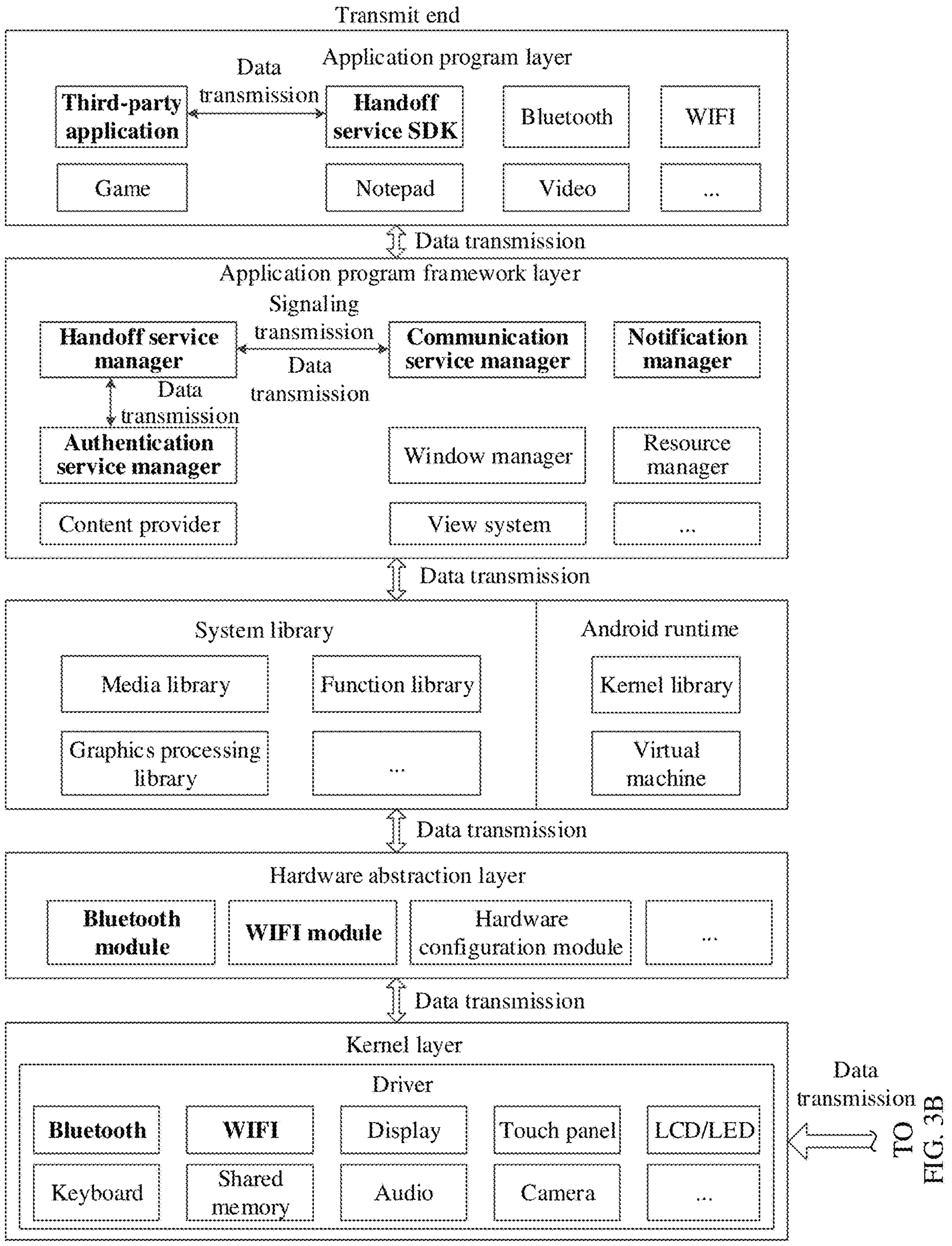
FIG. 3A and FIG. 3B are a schematic diagram of a software structure of a terminal device according to an embodiment of this application.
Figure 3B:
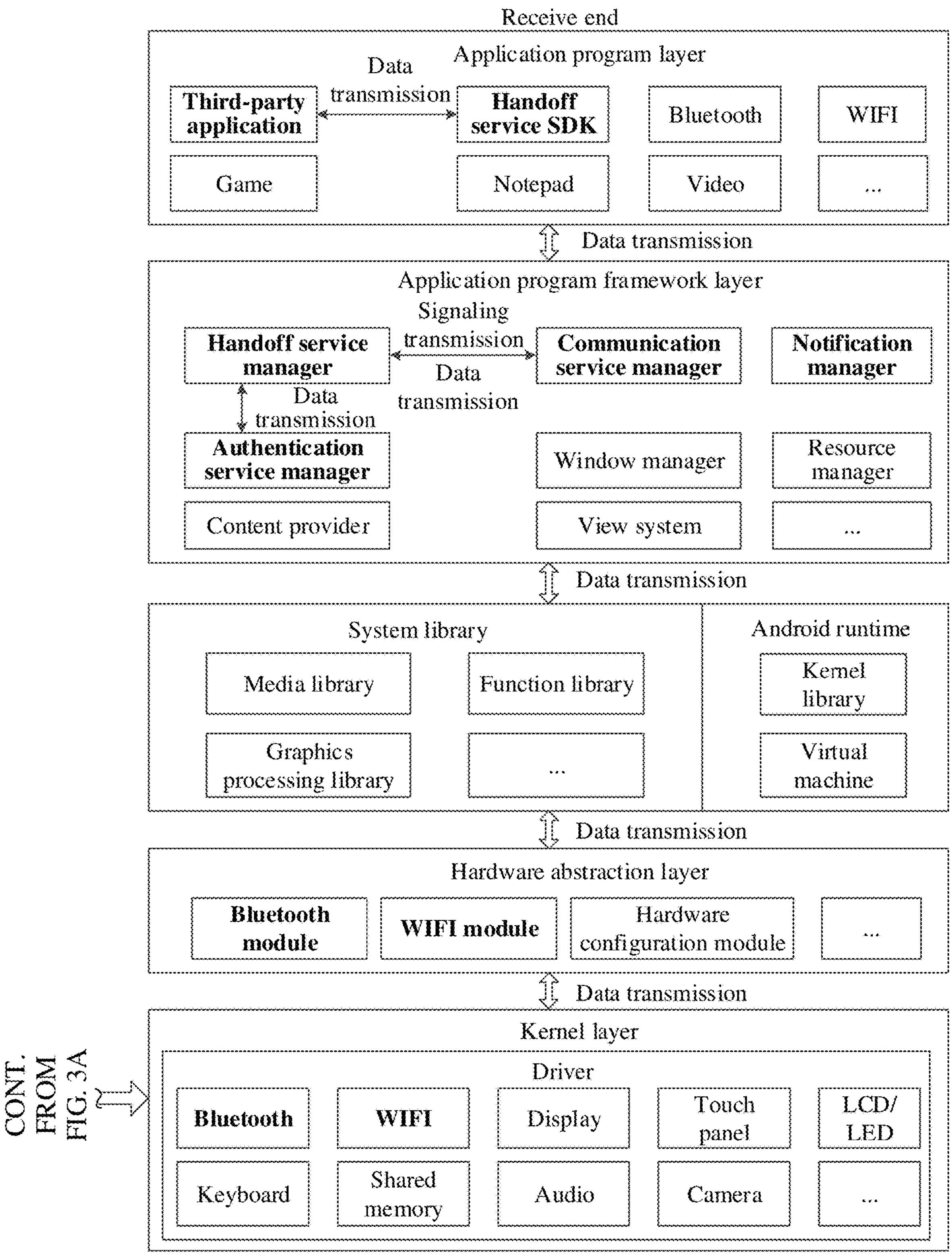

As shown in FIG. 3A and FIG. 3B, the transmit end is used as an example, the layered architecture divides software into several layers, and each layer has a clear role and task. The layers transmit data to and communicate with each other through a software interface. In some embodiments, the Android system is divided into five layers: an application program layer, an application program framework layer, an Android runtime (Android runtime) and a system library, a hardware abstraction layer (hardware abstract layer, HAL), and a kernel layer from top to bottom.

The application program layer may include a series of application program packages. As shown in FIG. 3A and FIG. 3B, the application program package may include application programs such as a third-party application, a software development kit (software development kit, SDK), Bluetooth, WIFI, Notepad, Video, and Game. For example, in this embodiment of this application, at the application program layer, a handoff application may access a handoff service SDK, the handoff application may be a system application on the terminal device or may be a third-party application, and an application such as Notepad, Video, or Game may be a system application or a third-party application.

The application program framework layer provides an application programming interface (application programming interface, API) and a programming framework for the application program at the application program layer. The application program framework layer includes some predefined functions.

As shown in FIG. 3A and FIG. 3B, the application program framework layer may include a handoff service manager, a communication service manager, an authentication service manager, a notification manager, a window manager, a resource manager, a content provider, a view system, and the like. The manager may also be referred to as a module in some application scenarios.

The handoff service manager may be responsible for management of a handoff task, and may be a core of an entire handoff service framework. For example, in this embodiment of this application, the handoff service manager may be responsible for access of the handoff application, authentication of the handoff application, icon management of the handoff application, and transmission of handoff data across devices.

The communication service manager may be configured to implement data transmission across devices. For example, in this embodiment of this application, the communication service manager may implement security authentication and account authentication of devices with a same account, device self-discovery and ad hoc networking, data transmission between devices, access to a communication service, and the like.

The authentication service manager may be responsible for validity verification of the application. For example, in this embodiment of this application, after verification performed by the authentication service manager succeeds, the application may be allowed to access the handoff service.

The notification manager enables an application program to display notification information in a status bar, and may be configured to convey a notification message that may automatically disappear after a short stay without requiring user interaction. For example, the notification manager is configured to provide a notification of download completion, a message reminder, and the like. The notification manager may alternatively be a notification that appears in the status bar at the top of the system in a form of a graph or scroll bar text, for example, a notification of an application program running in the background, or a notification that appears on a screen in a form of a dialog window. For example, text information is prompted in the status bar, a prompt tone is made, the terminal device vibrates, or an indicator light blinks. For example, in this embodiment of this application, when the terminal device receives a broadcast handoff notification, the notification manager may display the broadcast handoff notification in a taskbar.

The window manager is configured to manage a window program. The window manager may obtain a size of a display, determine whether there is a status bar, lock a screen, touch a screen, drag a screen, capture a screenshot, and the like.

The resource manager provides various resources for an application program, for example, a localized string, an icon, a picture, a layout file, and a video file.

The content provider is configured to implement a data sharing function between different application programs, to allow one program to access data in another program, and ensure security of the accessed data.

The view system may be responsible for interface drawing and event processing of the application program. For example, in this embodiment of this application, the view system may be configured to perform event processing after a user taps a notification icon of the handoff application.

The Android runtime includes a kernel library and a virtual machine. The Android runtime is responsible for scheduling and management of the Android system.

The kernel library includes two parts: One part is a functional function that needs to be invoked by a java language, and the other part is a kernel library of Android.

The application program layer and the application program framework layer run in the virtual machine. The virtual machine executes java files at the application program layer and the application program framework layer as binary files. The virtual machine is configured to perform functions such as lifecycle management of an object, stack management, thread management, security and exception management, and garbage collection.

The system library may include a plurality of functional modules, for example, a media library (Media Libraries), a function library (Function Libraries), a graphics processing library (for example, OpenGL ES), and the like.

The media library supports playing and recording in a plurality of common audio and video formats, a still image file, and the like. The media library may support a plurality of audio and video coding formats, for example, MPEG4, H.264, MP3, AAC, AMR, JPG, and PNG.

The function library provides a developer with API interfaces for a plurality of services, to help the developer quickly integrate and implement various functions.

The graphics processing library is configured to implement graphics drawing, image rendering, composition, layer processing, and the like.

The hardware abstraction layer is an abstraction layer structure between the kernel layer and the Android runtime. The hardware abstraction layer may be an encapsulation of a hardware driver, and provides a unified interface for invocation of an upper-layer application. The hardware abstraction layer may include a Bluetooth module, a WIFI module, a hardware configuration module, and the like. For example, in this embodiment of this application, the Bluetooth module and the WIFI module at the hardware abstraction layer may shield specific hardware implementation details of a Bluetooth driver and a WIFI driver at the kernel layer, and the upper-layer application may implement a Bluetooth function and a WIFI function by invoking the interface without knowing a specific implementation of the hardware driver at the kernel layer.

The kernel layer is a layer between hardware and software. The kernel layer may include a display driver, a camera driver, an audio driver, a Bluetooth driver, a WiFi driver, a central processing unit driver, and the like. For example, in this embodiment of this application, the communication service manager may implement connection across devices by using a related module such as the Bluetooth driver and the WiFi driver, to implement device self-discovery and ad hoc networking.

With reference to a scenario in which a broadcast handoff notification is displayed between terminal devices in an application handoff process, the following describes a transmission procedure of handoff data in a layered framework of an Android system by using an example.

As shown in FIG. 3A and FIG. 3B, at an application program layer of a transmit end, an application program may access a handoff service SDK to implement data transmission with a handoff service. The handoff service SDK may send a handoff service binding and application handoff service registration request to a handoff service manager, to implement data transmission of handoff application registration and binding between the application program layer and an application program framework layer.

At the application program framework layer, the handoff service manager may perform signaling transmission and data transmission with a communication service manager, to complete binding of a communication service. The handoff service manager may further implement a binding authentication service and application authentication with an authentication service manager.

After registration of the handoff application succeeds, the communication service manager may invoke a Bluetooth module interface and a WIFI module interface provided at a hardware abstraction layer to implement device self-discovery and ad hoc networking, and implement session connection, message transfer, transmission of handoff content, and the like between terminal devices by using a Bluetooth driver and a WIFI driver at a kernel layer.

After receiving, based on a kernel layer, handoff-related data transferred by the transmit end, a receive end may transmit the data to a related module at a hardware abstraction layer. At an application program framework layer of the receive end, a communication service manager may obtain the transmitted handoff data through an interface provided at the hardware abstraction layer, and perform signaling transmission and data transmission with a handoff service manager. After receiving the handoff-related data, the handoff service manager may implement a binding authentication service and application authentication with an authentication service manager. Further, the handoff service manager may indicate a desktop launcher to display a broadcast handoff notification in an icon form.

Figure 4A:
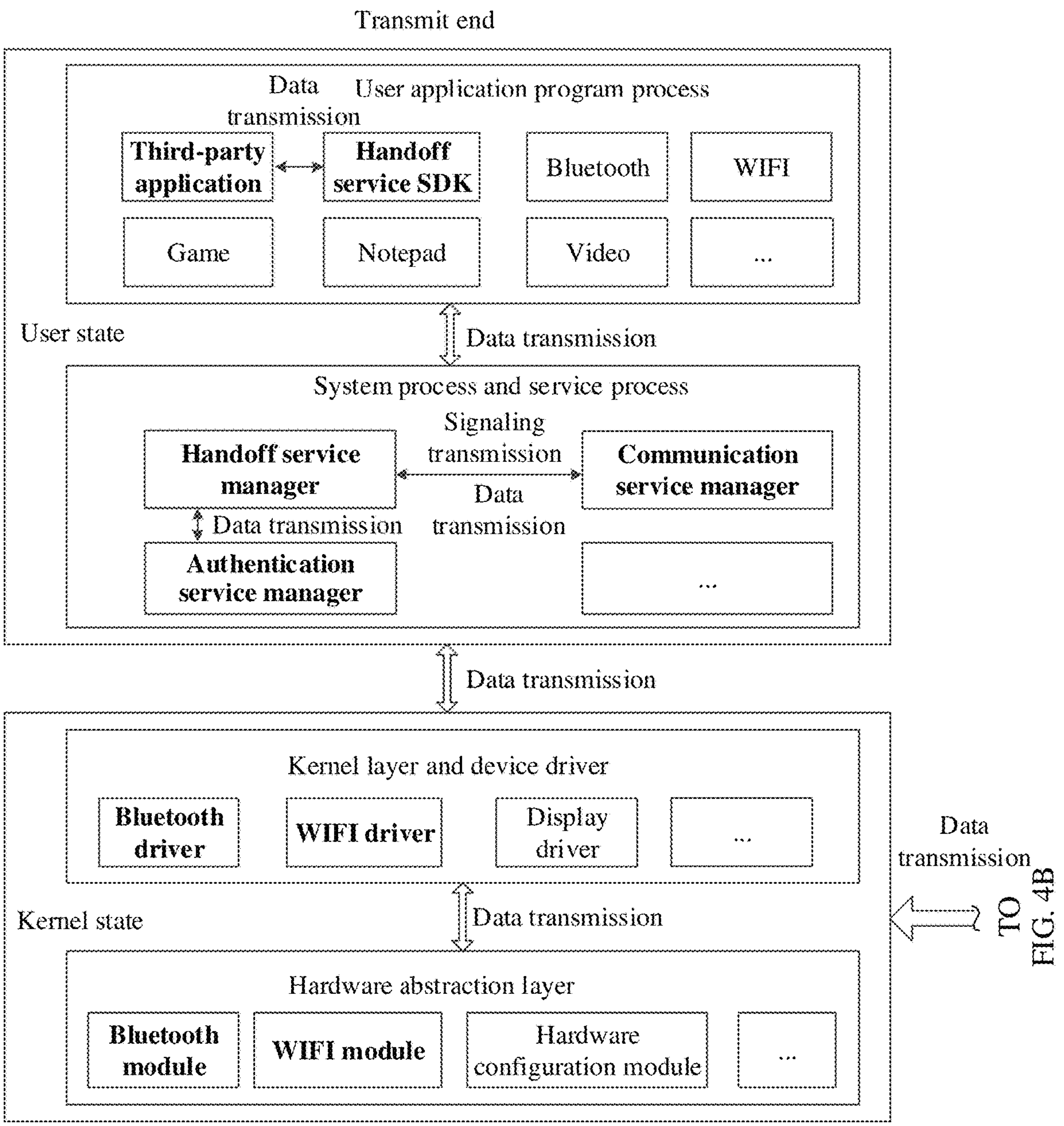
FIG. 4A and FIG. 4B are a schematic diagram of another software structure of a terminal device according to an embodiment of this application.
Figure 4B:
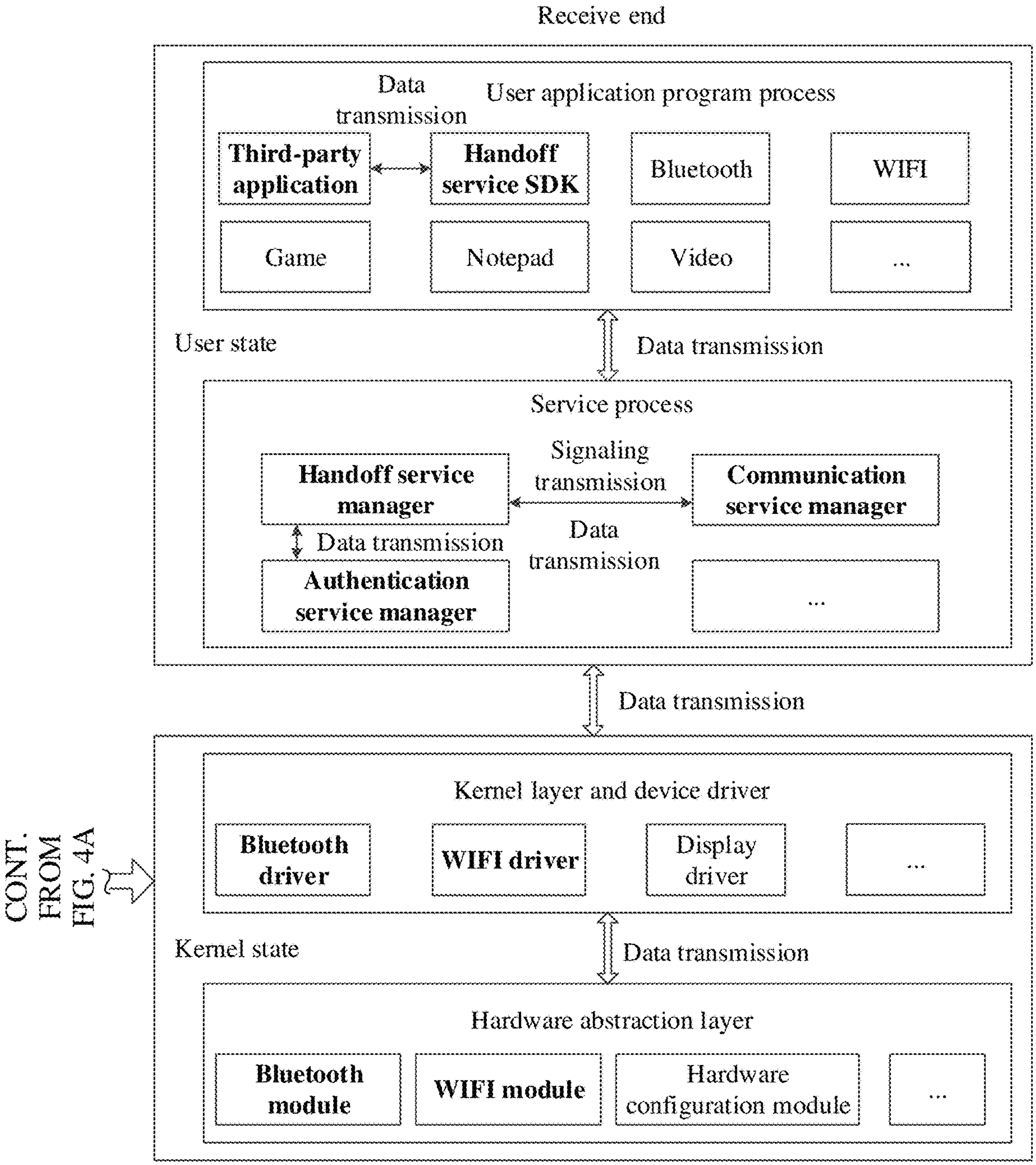

It may be understood that the transmit end or the receive end in this embodiment of this application may alternatively use a Windows system. As shown in FIG. 4A and FIG. 4B, a difference from the Android system is that a layered architecture of the Windows system is mainly divided into a user state and a kernel state. The user state may include a user application program process, a system process, a service process, and the like. The kernel state may include a kernel, a device driver layer, a hardware abstraction layer, and the like.

The user application program process may execute a series of application programs. A specific executable application program type may be the same as an application program type at an application program layer of the Android system. Details are not described herein again.

The system process and the service process may include a handoff service manager, a communication service manager, an authentication service manager, a system process, a notification manager, a window manager, and the like, to provide a corresponding service for execution of the user application program process. For specific functions of processes such as the handoff service manager, the communication service manager, and the authentication service manager related to this embodiment of this application, refer to descriptions of related managers in Android. Details are not described herein.

The kernel layer and the device driver layer may include a Bluetooth driver, a WiFi driver, a display driver, and the like. The hardware abstraction layer may include a Bluetooth module, a WIFI module, a hardware configuration module, and the like. For specific functions of the functional modules, refer to related descriptions in Android. Details are not described herein.

The following describes in detail the application handoff method in the embodiments of this application. The following embodiments may be combined with each other or separately implemented, and same or similar concepts or processes may not be described in some embodiments. In the embodiments of this application, an application program is briefly referred to as an "application".

Figure 5:
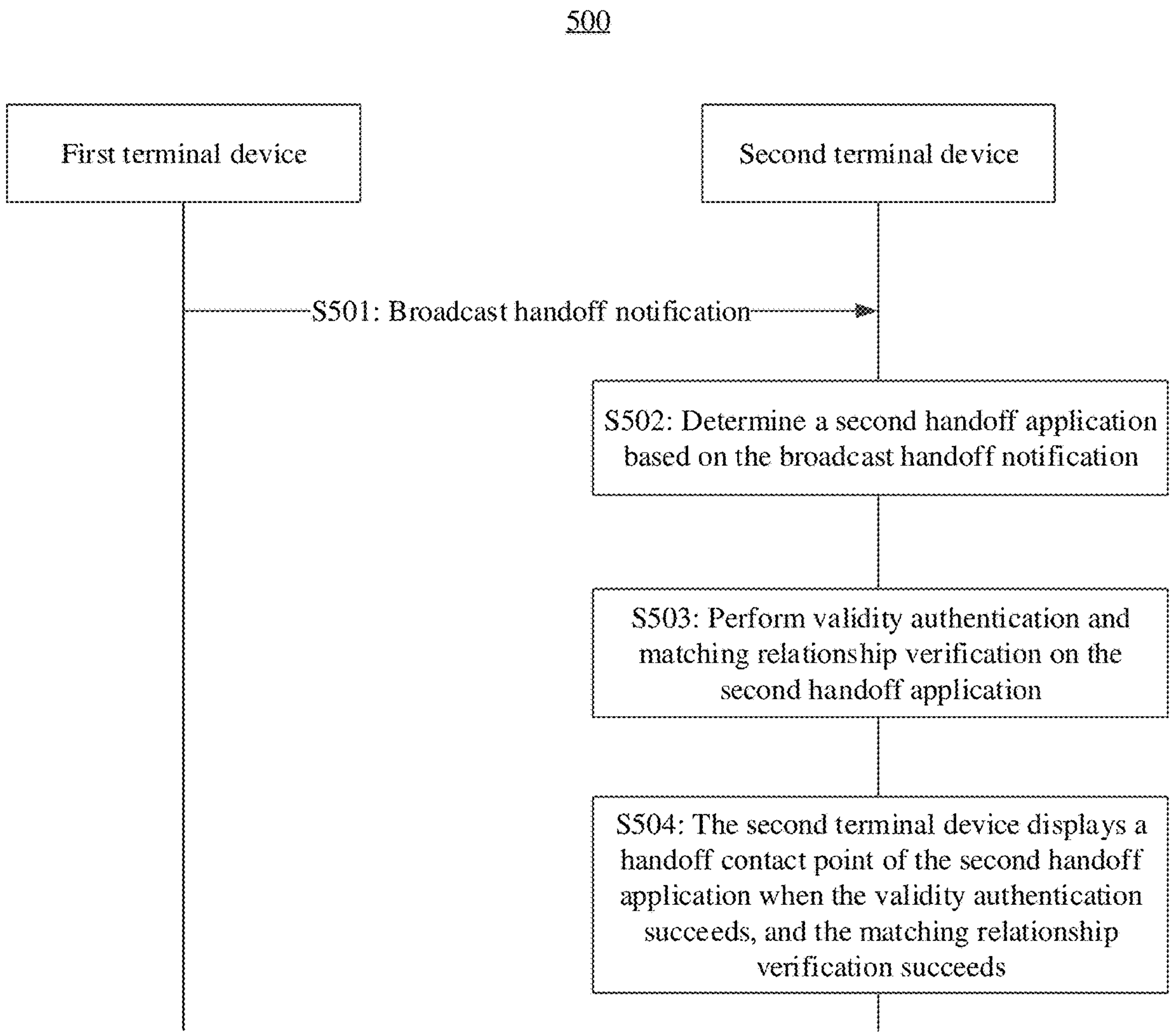
FIG. 5 is a schematic flowchart of an application handoff method according to an embodiment of this application.

FIG. 5 is a schematic flowchart of an application handoff method 500 according to an embodiment of this application. The method 500 may be applied to the foregoing scenario 100. A hardware structure of a terminal device in the method 500 may be shown in FIG. 2, and a software structure may be shown in FIG. 3A and FIG. 3B or FIG. 4A and FIG. 4B. A first terminal device may correspond to the transmit end in FIG. 3A and FIG. 3B or FIG. 4A and FIG. 4B, and a second terminal device may correspond to the receive end in FIG. 3A and FIG. 3B or FIG. 4A and FIG. 4B.

S501: The first terminal device sends a broadcast handoff notification to the second terminal device, and correspondingly, the second terminal device receives the broadcast handoff notification from the first terminal device.

Specifically, the broadcast handoff notification is used to request to hand off a first handoff application on the first terminal device to the second terminal device.

S502: The second terminal device determines a second handoff application based on the broadcast handoff notification.

Specifically, the broadcast handoff notification carries a device type of at least one target handoff application, and the second terminal device determines a target handoff application of a same device type as the second terminal device as the second handoff application.

S503: The second terminal device performs validity authentication and matching relationship verification on the second handoff application, to obtain a validity authentication result and a matching relationship verification result.

S504: The second terminal device displays a handoff contact point of the second handoff application when the validity authentication result is that the validity authentication succeeds, and the matching relationship verification result is that the matching relationship verification succeeds.

According to the application handoff method in this embodiment of this application, validity authentication and matching relationship verification are performed on the second handoff application on the second terminal device, and when both the validity authentication and the matching relationship verification succeed, the handoff contact point of the second handoff application is displayed on the second terminal device, to avoid handing off content in an application to an application with an unreliable trust source, and improve application handoff security, so as to improve user experience.

The following describes in detail the application handoff method in the embodiments of this application.

After being developed, an application needs to be registered with a cloud server and apply for handoff permission to the cloud server.

It should be understood that an application developer may apply for registration and handoff permission by using an open platform. The open platform may be understood as a web page or a client of the open platform, and can communicate with the cloud server. Specifically, the application developer may log in to a developer account of the application developer by using a device (for example, a tablet computer, a computer, or a notebook computer) of the application developer, enter a developer interface of the open platform, register the application by filling in related information about the application, and apply for handoff permission for the application. An administrator of the open platform may log in to an administrator account of the administrator by using a device (for example, a tablet computer, a computer, or a notebook computer) of the administrator, enter an administrator interface of the open platform, review information submitted by the application developer, and allocate an application identifier (application identification, APPID) and handoff permission to the application.

FIG. 6A, FIG. 6B, FIG. 6C, and FIG. 6D are a schematic diagram of a developer interface of an open platform according to an embodiment of this application. FIG. 7 is a schematic flowchart of a method 700 for registering a handoff application and applying for handoff permission according to an embodiment of this application. With reference to FIG. 6A, FIG. 6B, FIG. 6C, FIG. 6D, and FIG. 7, the following describes in detail a process in which an application developer performs registration and applies for handoff permission on an open platform.

Figure 6A:
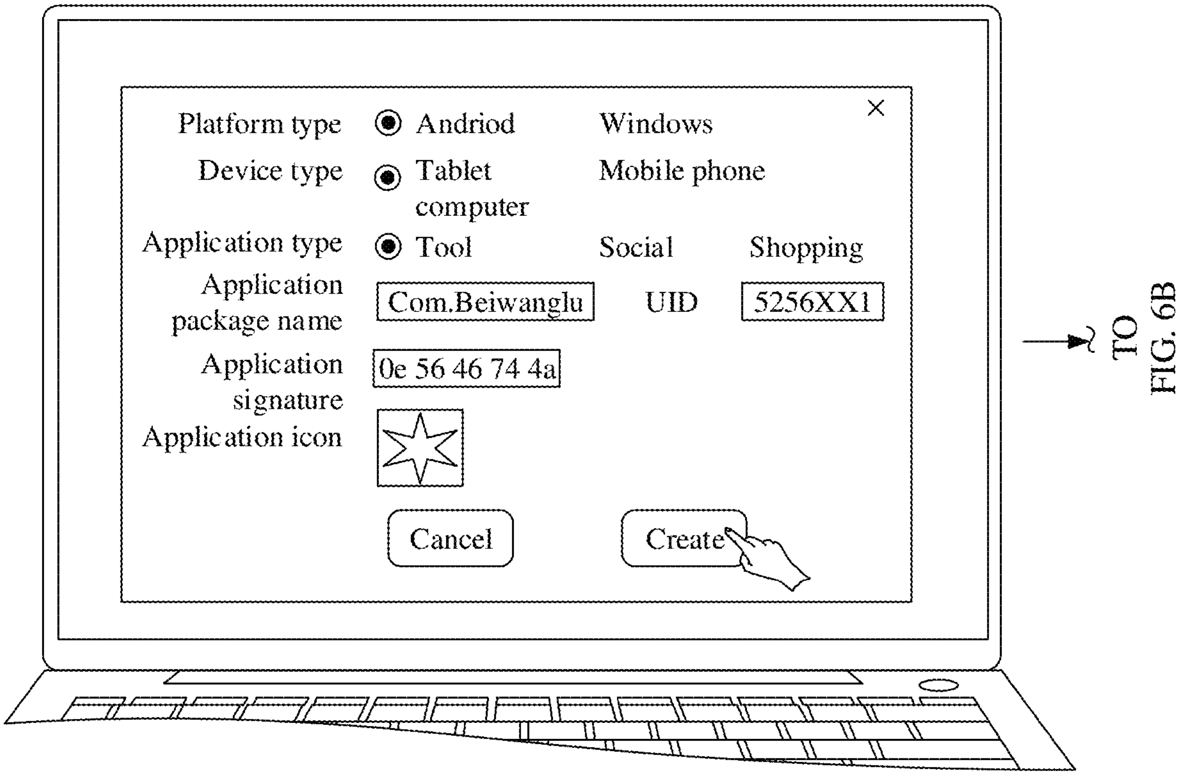
FIG. 6A, FIG. 6B, FIG. 6C, and FIG. 6D are a schematic diagram of a developer interface of an open platform according to an embodiment of this application.

As shown in FIG. 6A, in an interface in FIG. 6A, the application developer selects a platform type of a to-be-registered application as "Android", a device type of the to-be-registered application as a "tablet computer", and an application type of the to-be-registered application as a tool type, enters an application package name "Com.Beiwanglu" of the to-be-registered application, a user identifier (user identification, UID) "5256XX1" of the to-be-registered application, and an application signature "0e 56 46 74 4a" of the to-be-registered application, and uploads an application icon (that is, a six-pointed star-style icon shown in FIG. 6A) of the to-be-registered application. Then, the application developer taps a "create" button. As shown in FIG. 7, in response to a tap operation performed by the application developer, the open platform sends a registration instruction to a cloud server, where the registration instruction carries related information selected and entered by the application developer. The cloud server receives the registration instruction, and sends a review task generation instruction to the open platform based on the related information selected and entered by the application developer, where the review task generation instruction is used to generate a review task for an administrator account of the open platform. The open platform receives the review task generation instruction, and displays a review task prompt message button in an administrator interface of the open platform based on the review task generation instruction. An administrator of the open platform taps the button to view the review task, and performs qualification review on the related information selected and entered by the application developer. If the qualification review succeeds, the administrator of the open platform taps a "succeed" button, and the open platform sends a review success instruction to the cloud server. The cloud server receives the review success instruction, allocates an APPID to the to-be-registered application, and sends the APPID to the open platform. After receiving the APPID of the to-be-registered application, the open platform jumps from the interface shown in FIG. 6A to an interface shown in FIG. 6B.

Figure 6B:
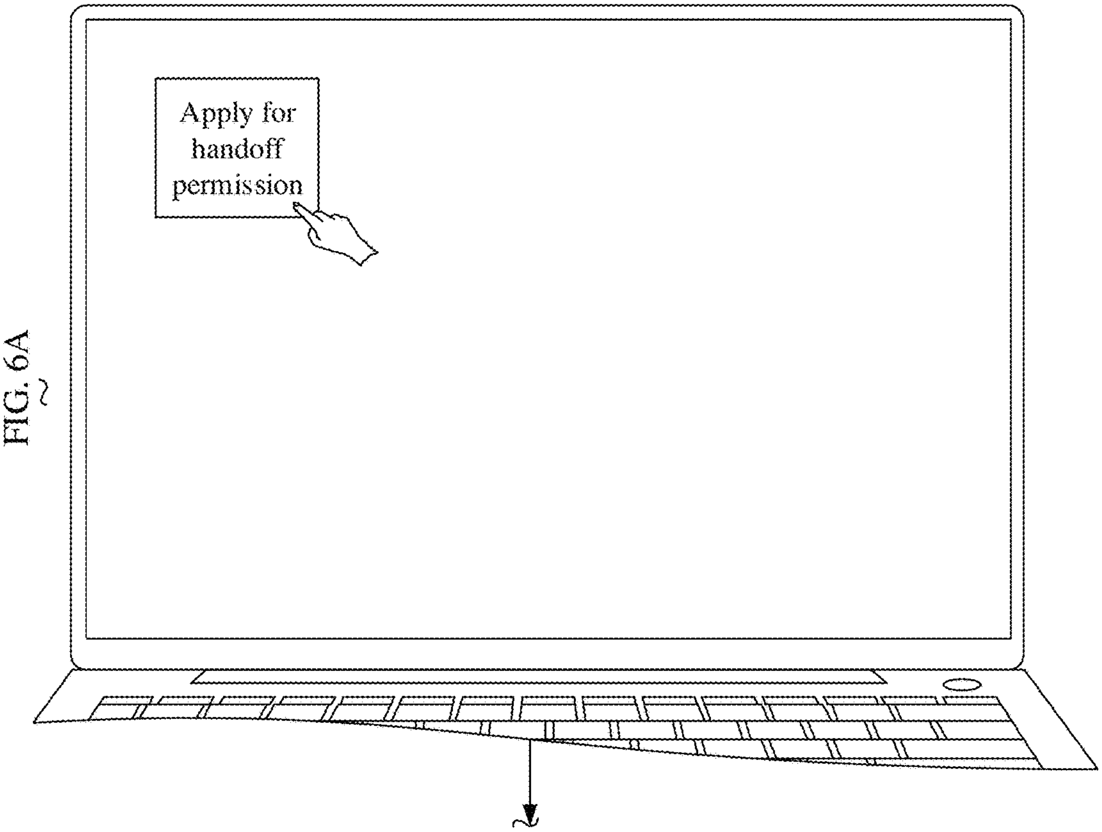
Figures 6B, 6C:
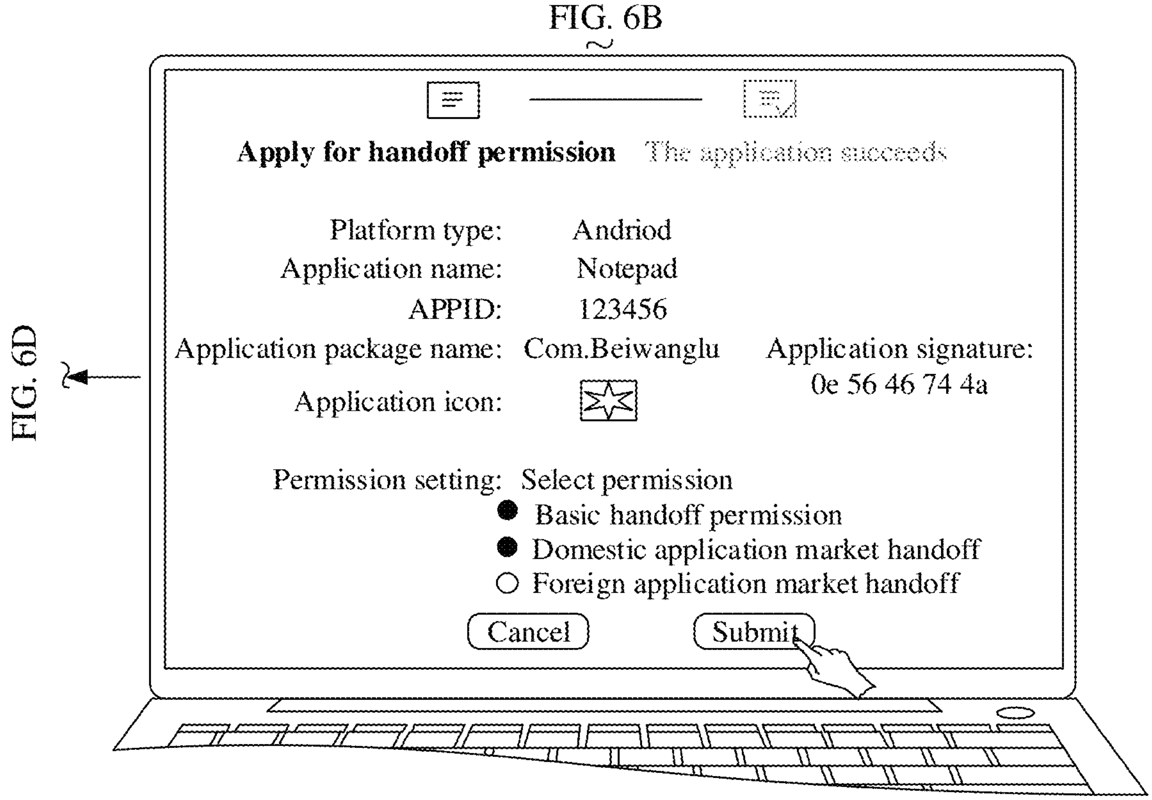
Figure 6D:
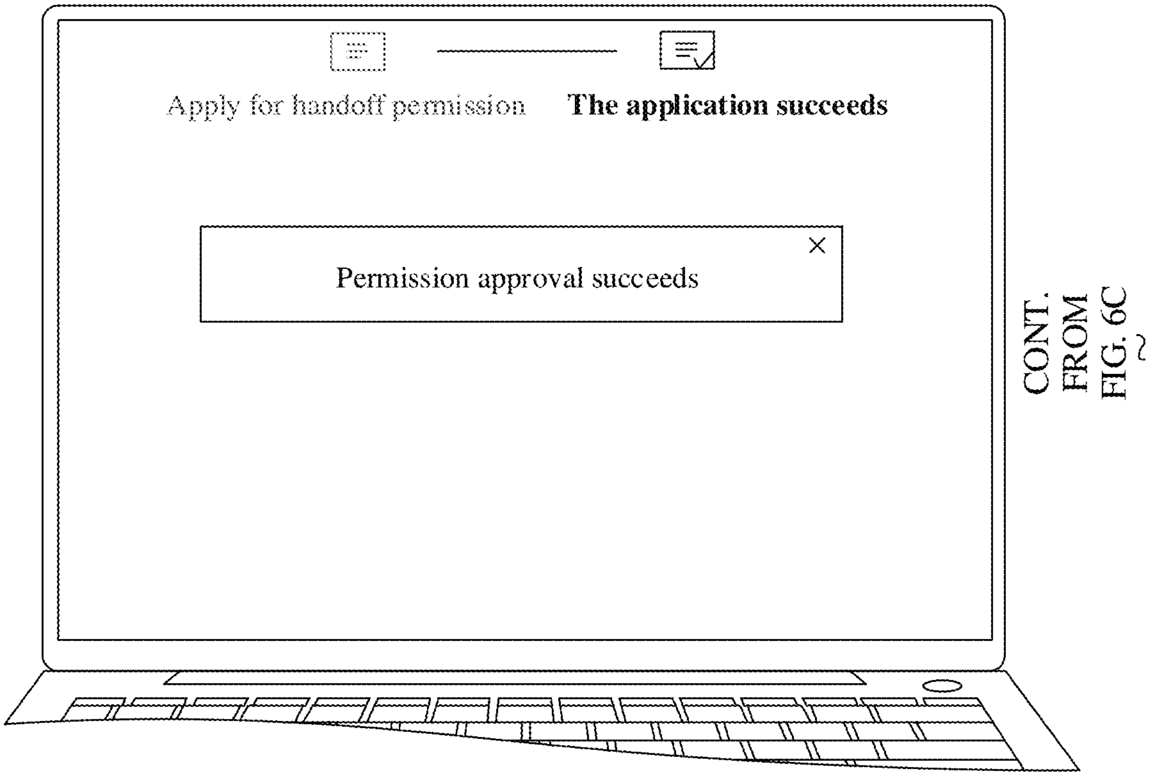
Figure 7:
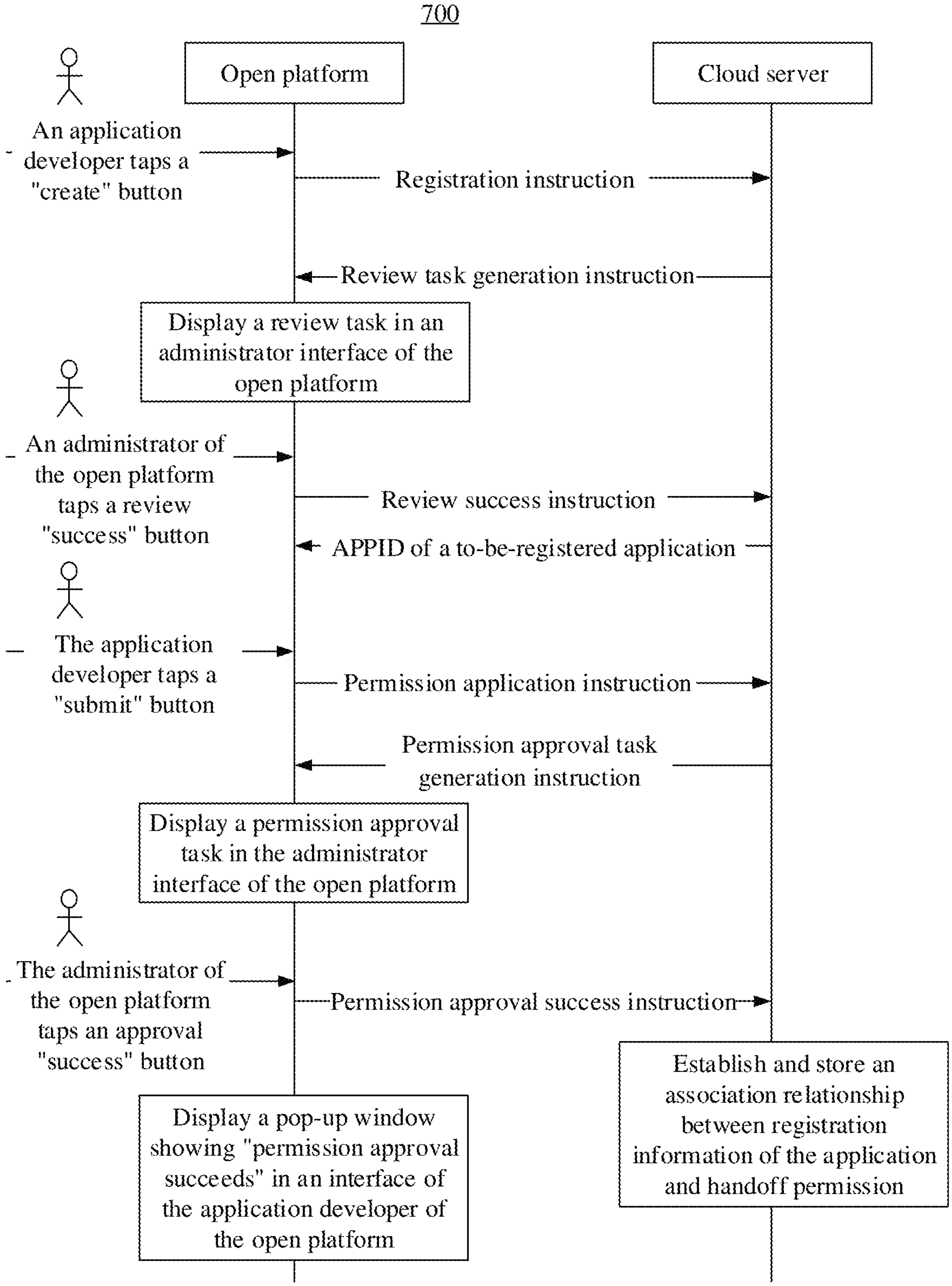
FIG. 7 is a schematic flowchart of registering a handoff application and applying for handoff permission according to an embodiment of this application.

In the interface shown in FIG. 6B, the application developer taps an "apply for handoff permission" button, and the interface jumps to an interface shown in FIG. 6C. Registration information such as a platform type "Android", an application name "Notepad", an APPID "123456", an application package name "Com.Beiwanglu", an application signature "0e 56 46 74 4a", and an application icon "six-pointed star-style icon" of a Notepad application, and a permission setting option are displayed in the interface shown in FIG. 6C. There are three permission setting options: 1: Basic handoff permission; 2: Domestic application market handoff; and 3: Foreign application market handoff. The application developer taps to select "basic handoff permission" and "domestic application market handoff", and taps a "submit" button. As shown in FIG. 7, in response to a tap operation performed by the application developer, the open platform sends a permission application instruction to the cloud server, and applies for basic handoff permission and domestic application market handoff permission to the cloud server. The cloud server receives the permission application instruction, where the permission application instruction carries the platform type, the application name, the APPID, the application package name, the application signature, the application icon, and related information selected by the application developer. Based on the permission application instruction, the cloud server sends a permission approval task generation instruction to the open platform, where the permission approval task generation instruction is used to generate a permission approval task for the administrator account of the open platform. The open platform receives the permission approval task generation instruction, and displays a permission approval task prompt message button in the administrator interface of the open platform. The administrator of the open platform taps the button to view the permission approval task, and approves the handoff permission selected by the application developer. If the permission approval succeeds, the administrator of the open platform taps a "succeed" button, and the open platform sends a permission approval success instruction to the cloud server. The cloud server receives the permission approval success instruction, establishes an association relationship among the platform type, the application name, the APPID, the application package name, the application signature, the application icon, and the handoff permission, and stores the association relationship. The open platform jumps from the interface shown in FIG. 6C to an interface shown in FIG. 6D. In the interface shown in FIG. 6D, the open platform displays a pop-up window showing "permission approval succeeds" in an interface of the application developer.

It should be understood that for the qualification review, only a case in which the qualification review succeeds is used above as an example for description. If the qualification review of the to-be-registered application fails, the cloud server does not allocate the APPID to the to-be-registered application, and the interface shown in FIG. 6A does not jump to the interface shown in FIG. 6B, but a prompt message is directly displayed to prompt the application developer that the qualification review fails. For the handoff permission approval, only a case in which the approval succeeds is used above as an example for description. If the handoff permission approval of the to-be-registered application fails, the cloud server does not establish and store the association relationship, and the open platform displays a prompt message indicating an approval result (that is, the approval fails) to the application developer in the interface of the developer.

It should be noted that the APPID is identification information allocated by the cloud server to the application in a process in which the application is registered with the cloud server, and the UID is identification information allocated in a process of developing the application. For a registered application, an installation package of the registered application carries an APPID, and the application may be installed on a terminal device, to parse and store the APPID of the application.

In embodiments of this application, the registration process shown in FIG. 6A, FIG. 6B, FIG. 6C, and FIG. 6D needs to be performed for applications on different platforms or different types of devices. In this way, the applications on different platforms or different types of devices can be handed off. For example, a developer of Notepad A on a mobile phone on an Android platform needs to register Notepad A with the cloud server, apply for handoff permission for Notepad A on the mobile phone on the Android platform, and obtain an APPID 1 of Notepad A on the mobile phone on the Android platform; a developer of Notepad B on a tablet computer on the Android platform needs to register Notepad B with the cloud server, apply for handoff permission for Notepad B on the tablet computer on the Android platform, and obtain an APPID 2 of Notepad B on the tablet computer on the Android platform; and a developer of Notepad C on a computer on a Windows platform further needs to register Notepad C with the cloud server, apply for handoff permission for Notepad C on the computer on the Windows platform, and obtain an APPID 3 of Notepad C on the computer on the Windows platform.

For an application on the Android platform, during registration, an application developer needs to enter information such as a package name, a signature, an icon, and the developer of the application on the Android platform. For an application on the Windows platform, during registration, an application developer needs to enter information such as a process name, registry information, an installation directory, a signature, an icon, and the developer of the application on the Windows platform.

For example, Table 1 shows descriptions and examples of information on the Android platform and the Windows platform.

TABLE 1

| Android platform | | | |
|---|---|---|---|
| Information item | Field | Description | Example |
| Application package name | (1) PackageName | Application package name on the Android platform | com.beiwanglu.demo |
| Signature | (2) Signature | Signature fingerprint of an Android application (a plurality of fingerprints may be registered) | SHA256 format: 0e 56 46 74 4a . . . |

TABLE 1-continued

| Windows platform | | | |
|---|---|---|---|
| Information item | Field | Description | Example (Demo is used as an example) |
| Main process name | (1) ProcessName | Process name on the Windows platform | Demo.exe |
| Signature | (2) Signature | Signature fingerprint of a Windows application (a plurality of fingerprints may be registered) | SHA1 format: 02 46 46 74 4a . . . |
| Registry information | (3) RegRoot | Registry path | "HKEY_CURRENT_USER\SOFTWARE\Demo" |
| | (4) RegKey | Installation directory value item | "InstallRoot" |
| | (5) ImagePath | Relative path between a main process and an installation directory | "\bin\" |

After the applications on different platforms or different types of devices are registered with the cloud server and handoff permission is applied for, a matching relationship between the applications may be established, for example, a matching relationship between Notepad A on the mobile phone on the Android platform and Notepad B on the tablet computer on the Android platform. In this way, the applications on different platforms or different types of devices can be subsequently handed off based on the matching relationship.

In embodiments of this application, the matching relationship may be established in a plurality of different manners.

Figure 8:
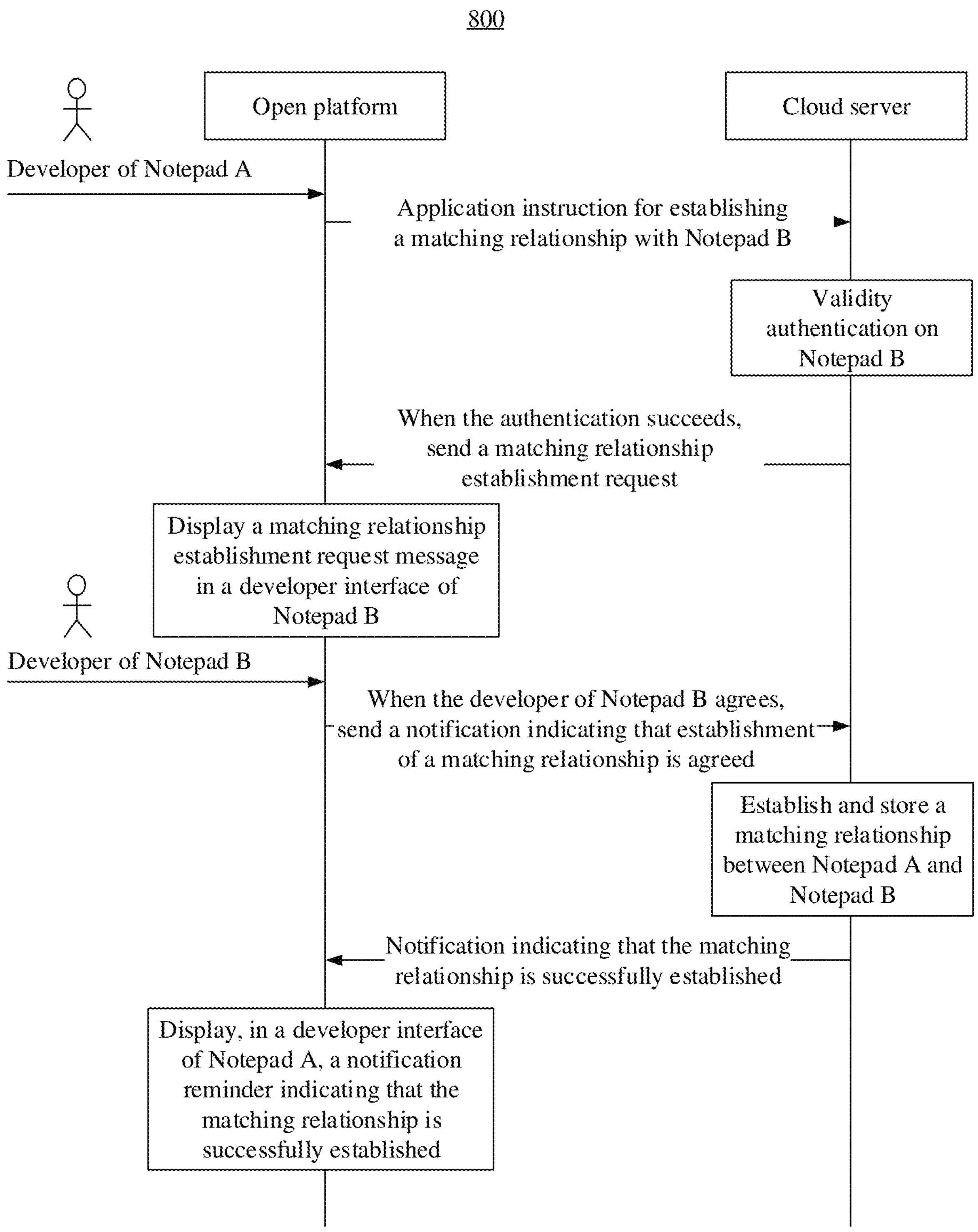
FIG. 8 is a schematic flowchart of applying to establish a matching relationship for a handoff application according to an embodiment of this application.

In a possible implementation, an application developer may apply to the cloud server to establish the matching relationship between the applications on different platforms or different types of devices. For example, the developer of Notepad A may apply to the cloud server to establish the matching relationship between Notepad A and Notepad B. FIG. 8 is a schematic flowchart of a method 800 for applying to establish a matching relationship for a handoff application according to an embodiment of this application.

As shown in FIG. 8, the developer of Notepad A logs in to a developer account of the developer on an open platform, enters information such as a platform type, the APPID, a package name, a signature, and the developer of target handoff Notepad B in a developer interface of Notepad A on the open platform, and then taps an "apply" button. In response to the tap operation, the open platform sends an application instruction to the cloud server, where the application instruction carries information such as the APPID of Notepad A, and the APPID, the package name, and the signature of Notepad B. The cloud server receives the application instruction, performs validity authentication on Notepad B, that is, queries, based on the APPID of Notepad B in the application instruction, a package name and a signature of Notepad B that are stored in the cloud server, and compares the package name and the signature of Notepad B that are stored in the cloud server with the package name and the signature of Notepad B that are carried in the application instruction. When the package name and the signature of Notepad B that are stored in the cloud server are the same as the package name and the signature of Notepad B that are carried in the application instruction, the cloud server considers that the validity authentication on Notepad B succeeds, and sends a matching relationship establishment request to the open platform, where the matching relationship establishment request carries information such as a platform type, the APPID, a package name, a signature, and the developer of Notepad A. The information such as the platform type, the package name, the signature, and the developer of Notepad A may be obtained by the cloud server through query based on a previous handoff application registration and handoff permission application process. The open platform receives the matching relationship establishment request, and displays a matching relationship establishment request message in a developer interface of Notepad B. The developer of Notepad B logs in to a developer account of the developer on the open platform, and performs a tap operation to agree to or reject the matching relationship establishment request. In response to the tap operation performed by the user, the open platform sends a notification indicating that establishment of a matching relationship is agreed or rejected to the cloud server. The cloud server receives the notification indicating that establishment of a matching relationship is agreed or rejected. When the notification is that establishment of a matching relationship is agreed, the cloud server establishes and stores a matching relationship between Notepad A and Notepad B, and sends a notification indicating that the matching relationship is successfully established to the open platform. The open platform receives the notification indicating that the matching relationship is successfully established, and displays, in the developer interface of Notepad A, a notification reminder indicating that the matching relationship is successfully established. Otherwise, the cloud server does not establish a matching relationship between Notepad A and Notepad B, and displays, in the developer interface of Notepad, a notification reminder indicating that establishment of the matching relationship fails.

In another possible implementation, an application developer may predefine a matching relationship of an application in an installation package of the application. When a user installs the application on a terminal device, the terminal device may directly store the matching relationship of the application. For example, the application developer may describe, in advance in a related file of the application, an APPID of another application (subsequently referred to as a target handoff application) trusted by the application, and establish a matching relationship between the application and the target handoff application.

For example, for an Android application, the application developer may describe the target handoff application by using Metadata in an AndroidManifest.xml manifest file;

and for a Windows application, the application developer may describe the target handoff application by using a registry value item of the application.

For example, both Notepad A and Notepad B are Android applications, the APPID of Notepad A is 123456, and the APPID of Notepad B is 654321. The developer of Notepad A provides the following description in metadata (metadata) in an AndroidManifest.xml manifest file of Notepad A:

```
<meta-data android:name=“com.xxx.xxx.client.appid”android:value=“123456”/>
<meta-data
android:name=“com.xxx.xxx.allowstart.appids”android:value=“654321”/>.
```

The description indicates that a target handoff application trusted by Notepad A includes Notepad B, that is, there is a matching relationship between Notepad A and Notepad B.

When the user installs Notepad A on the mobile phone, the mobile phone may parse an installation package of the application A to obtain the matching relationship between Notepad A and Notepad B, and store the matching relationship in a system registration module on the mobile phone.

A process of applying for permission and establishing a matching relationship for an application is described above. The following describes in detail the application handoff method in this application with reference to an interaction process between modules.

The application handoff method in this application may be divided into three phases. A first phase is registration and binding of a handoff application, a second phase is display of a handoff notification, and a third phase is obtaining and loading of handoff data.

A system for implementing the application handoff method across devices may include a first terminal device, a second terminal device, and a cloud server. The first terminal device may correspond to the transmit end in FIG. 3A and FIG. 3B or FIG. 4A and FIG. 4B, and the second terminal device may correspond to the receive end in FIG. 3A and FIG. 3B or FIG. 4A and FIG. 4B. Each of the first terminal device and the second terminal device may include functional modules for implementing a handoff service, for example, may include a handoff service SDK, a handoff service manager, a communication service manager, and an authentication service manager. The cloud server may include a functional module for implementing a handoff service, for example, a communication service manager, an authentication service module, and a matching verification module.

For case of description, a handoff application on the first terminal device is subsequently referred to as a first handoff application, a handoff service SDK of the first terminal device is referred to as a first handoff service SDK, a handoff service manager of the first terminal device is referred to as a first handoff service manager, a communication service manager of the first terminal device is referred to as a first communication service manager, and an authentication service manager of the first terminal device is referred to as a first authentication service manager.

A handoff application on the second terminal device is referred to as a second handoff application, a handoff service SDK of the second terminal device is referred to as a second handoff service SDK, a handoff service manager of the second terminal device is referred to as a second handoff service manager, a communication service manager of the second terminal device is referred to as a second communication service manager, an authentication service manager of the second terminal device is referred to as a second authentication service manager, and a desktop launcher of the second terminal device is referred to as a desktop launcher.

The communication service manager of the cloud server is referred to as a third communication service manager, the authentication service module of the cloud server is referred to as a third authentication service module, and the matching verification module of the cloud server is referred to as a matching verification module.

Figure 9A:
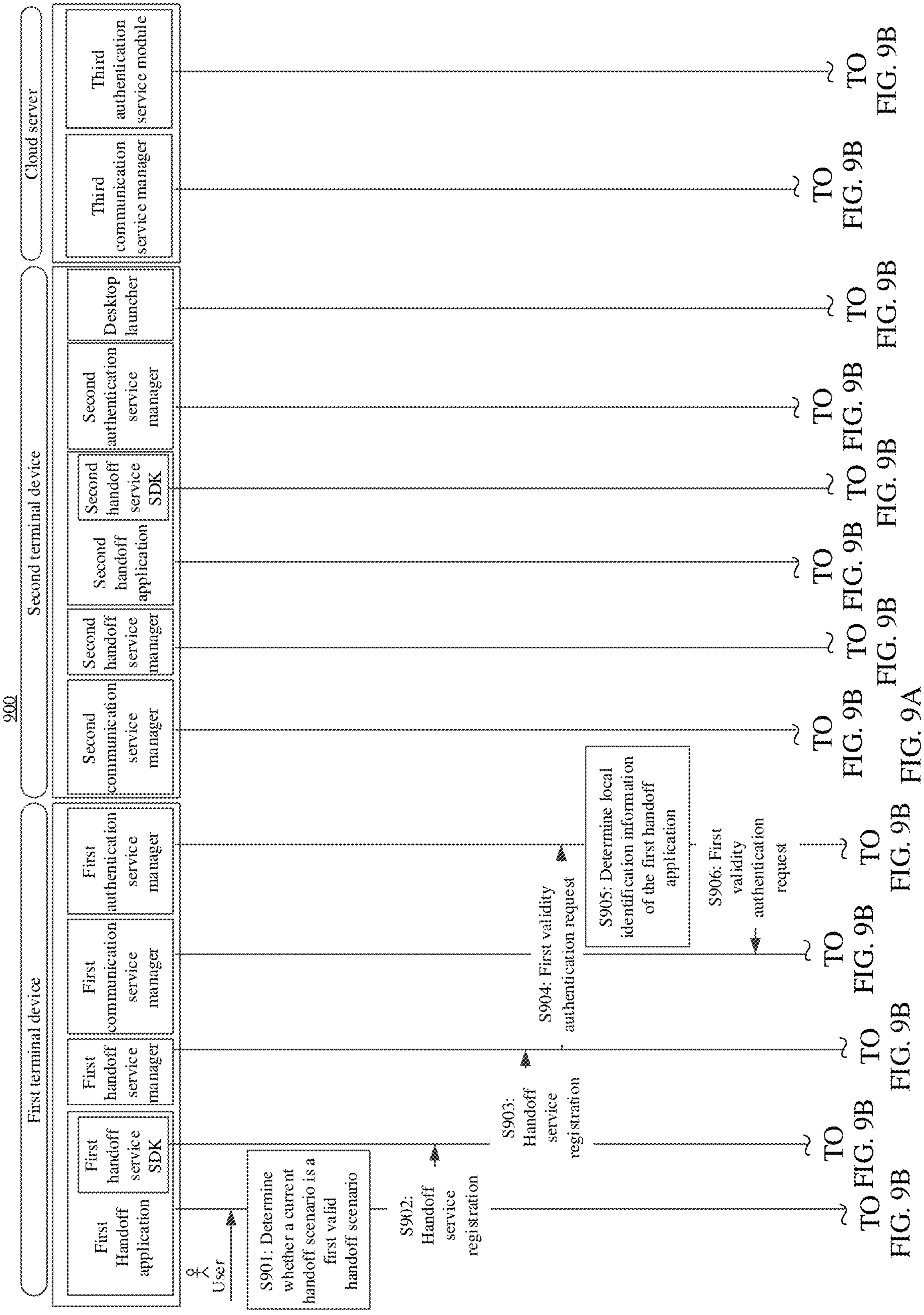
FIG. 9A and FIG. 9B are a schematic flowchart of a method for registering and binding a handoff application according to an embodiment of this application.
Figure 9B:
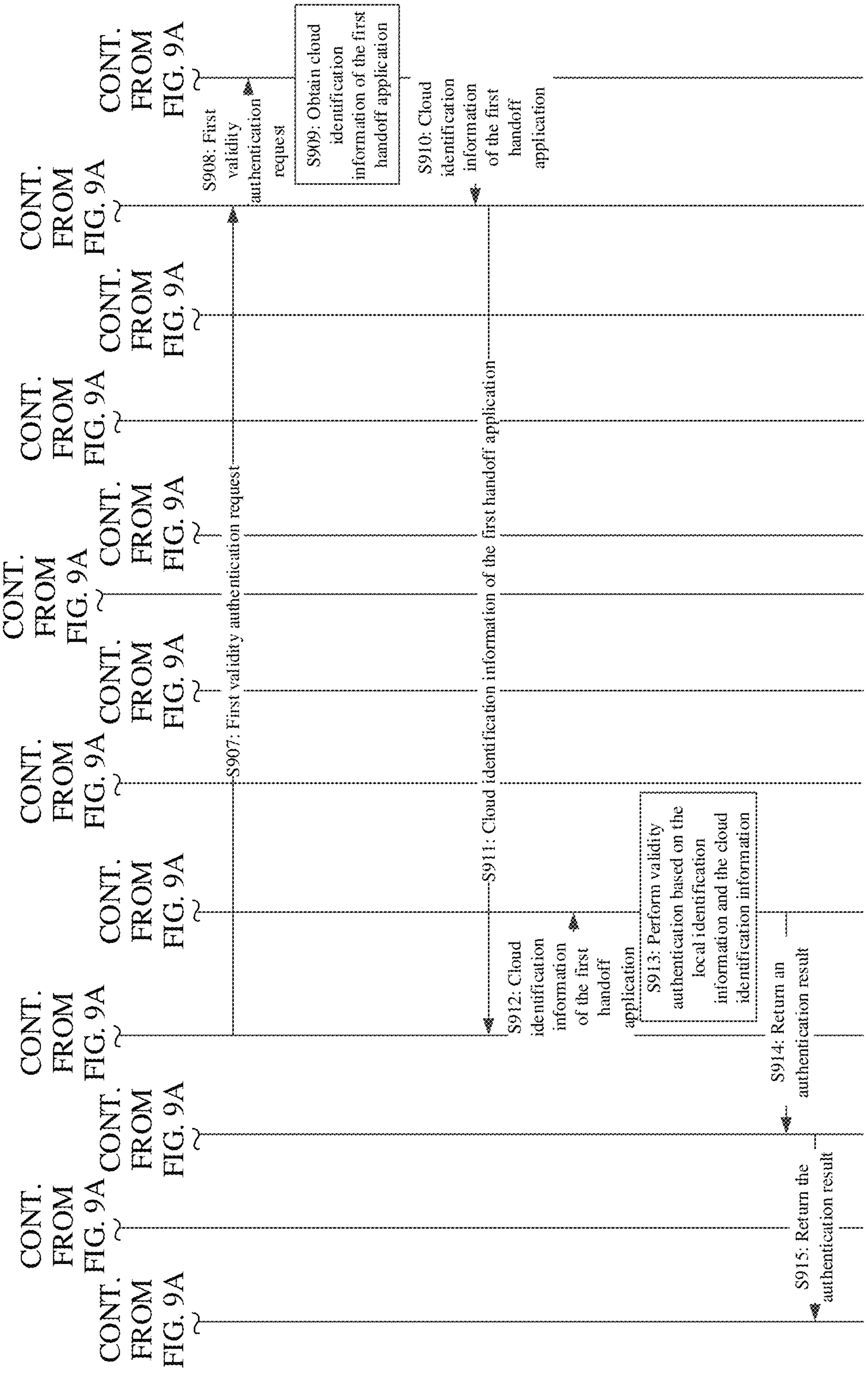
Figure 10A:
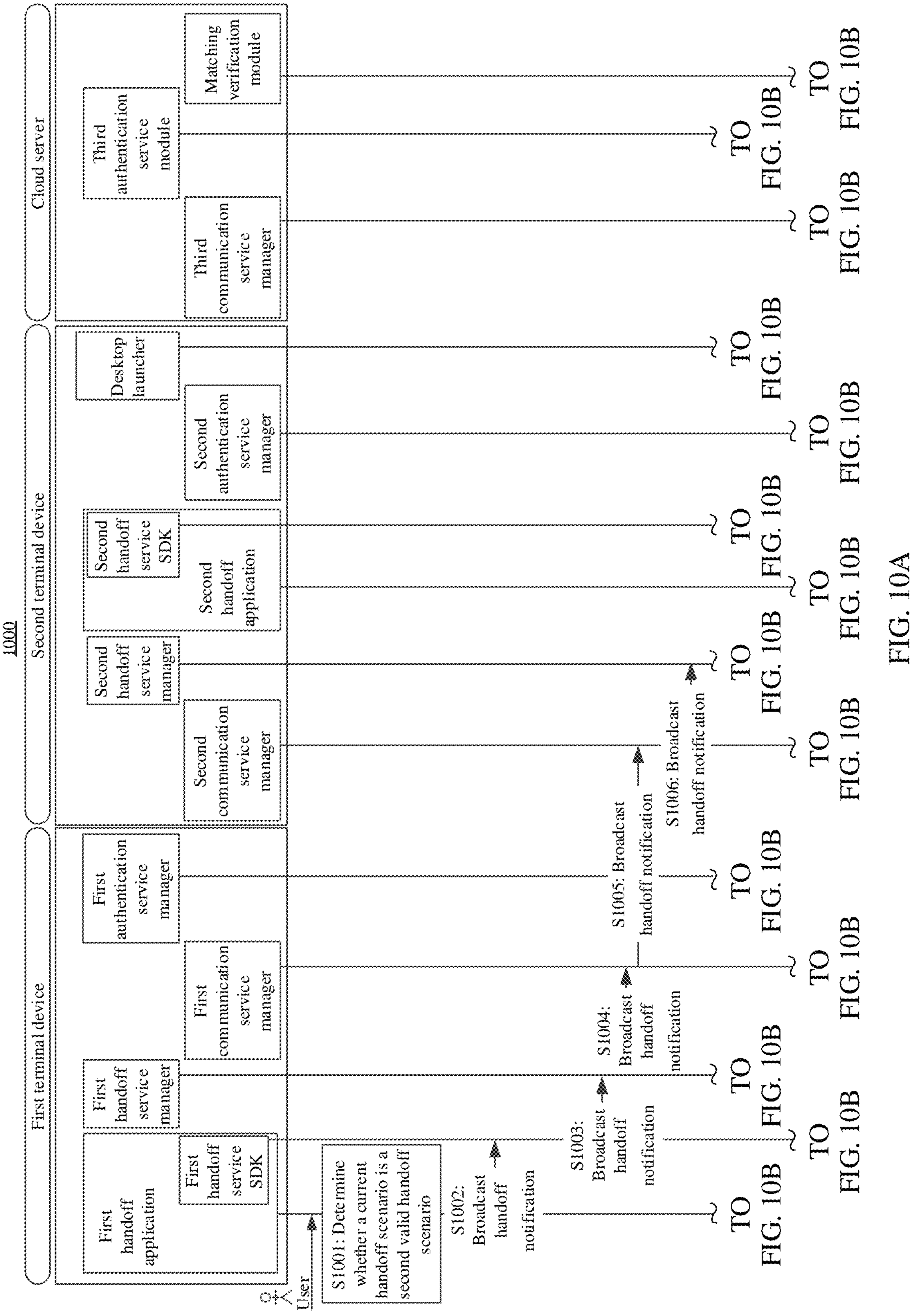
FIG. 10A, FIG. 10B, FIG. 10C, and FIG. 10D are a schematic flowchart of a method for displaying a handoff notification according to an embodiment of this application.
Figure 10B:
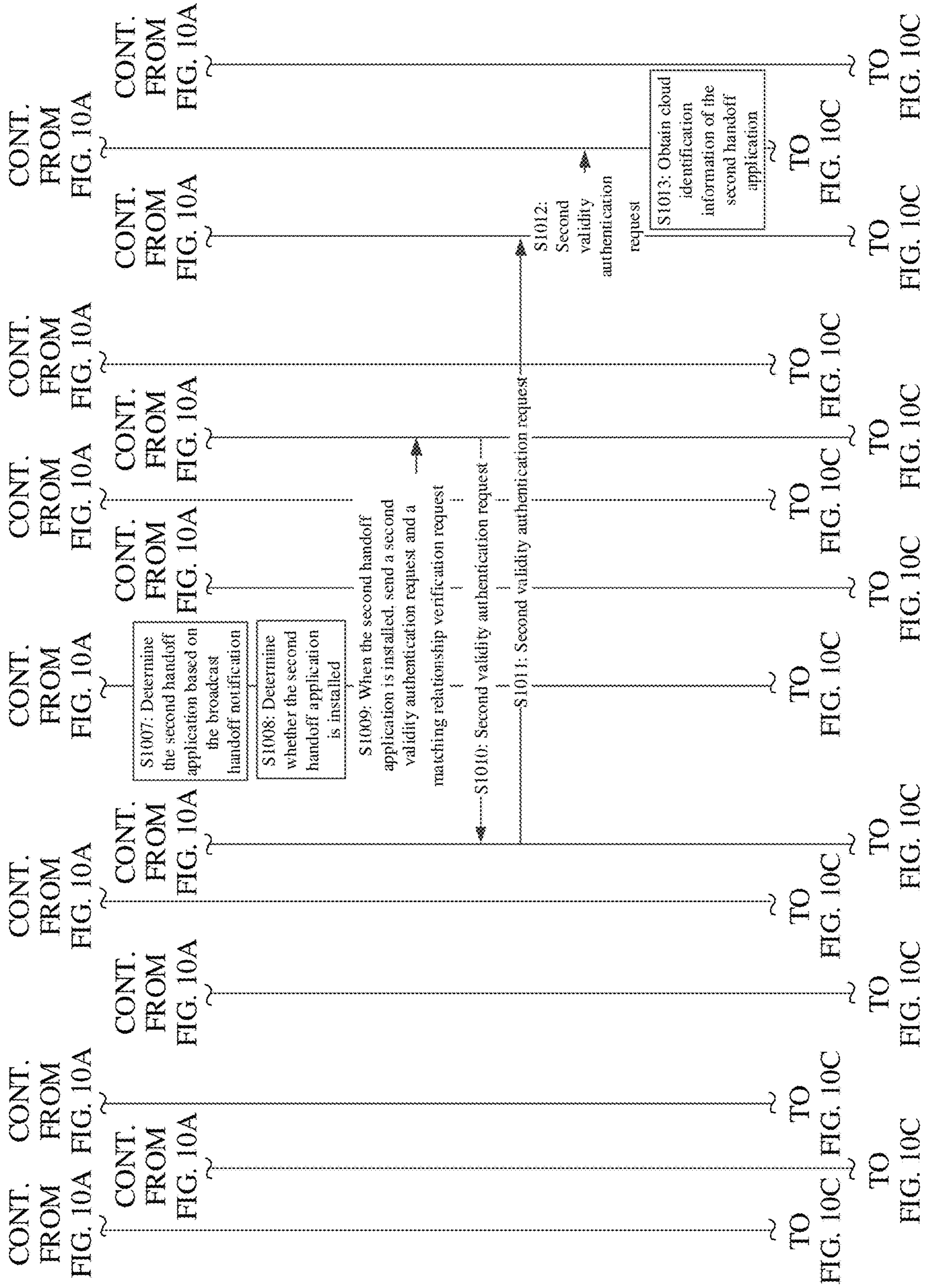
Figure 10C:
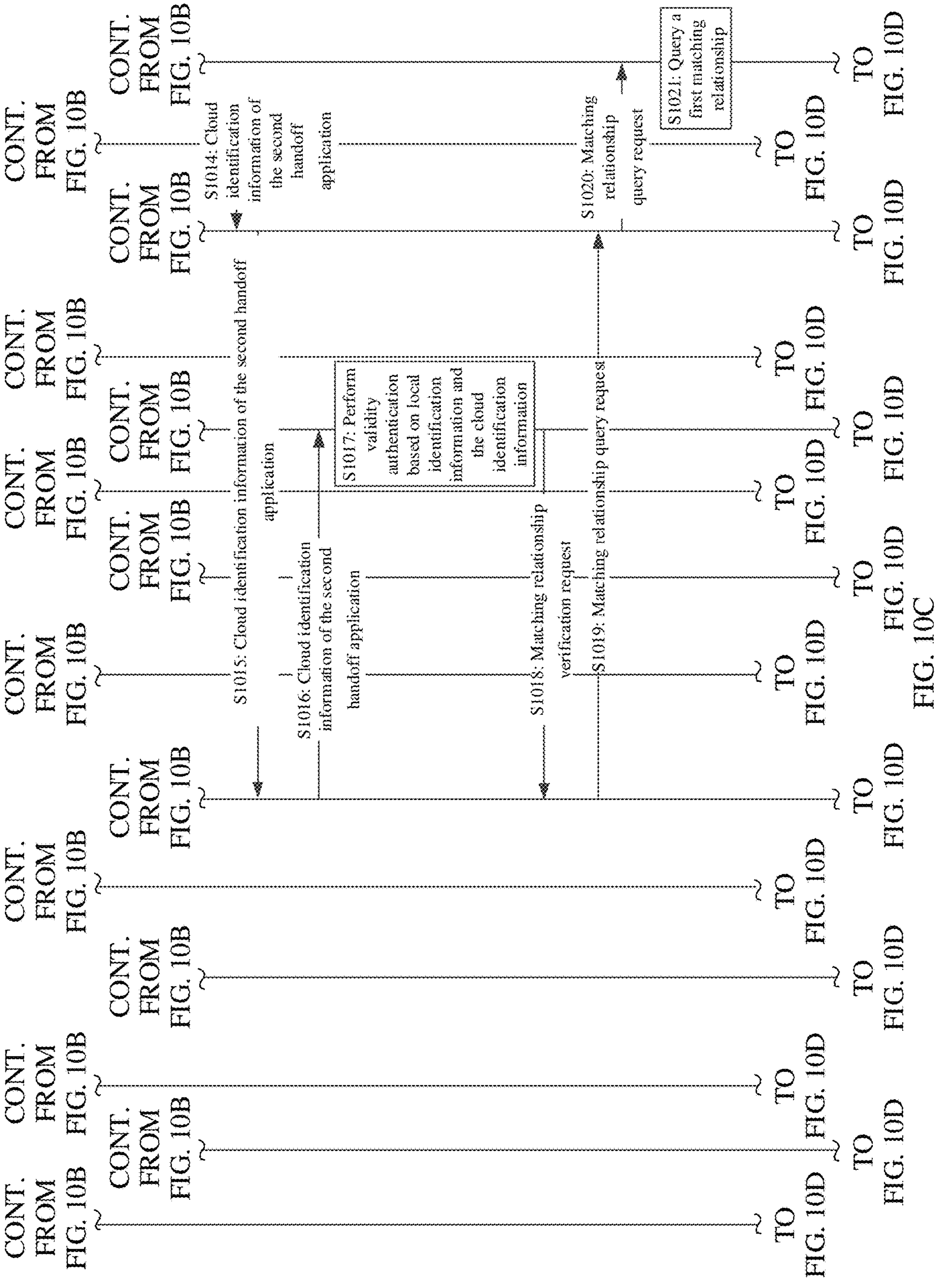
Figure 10D:
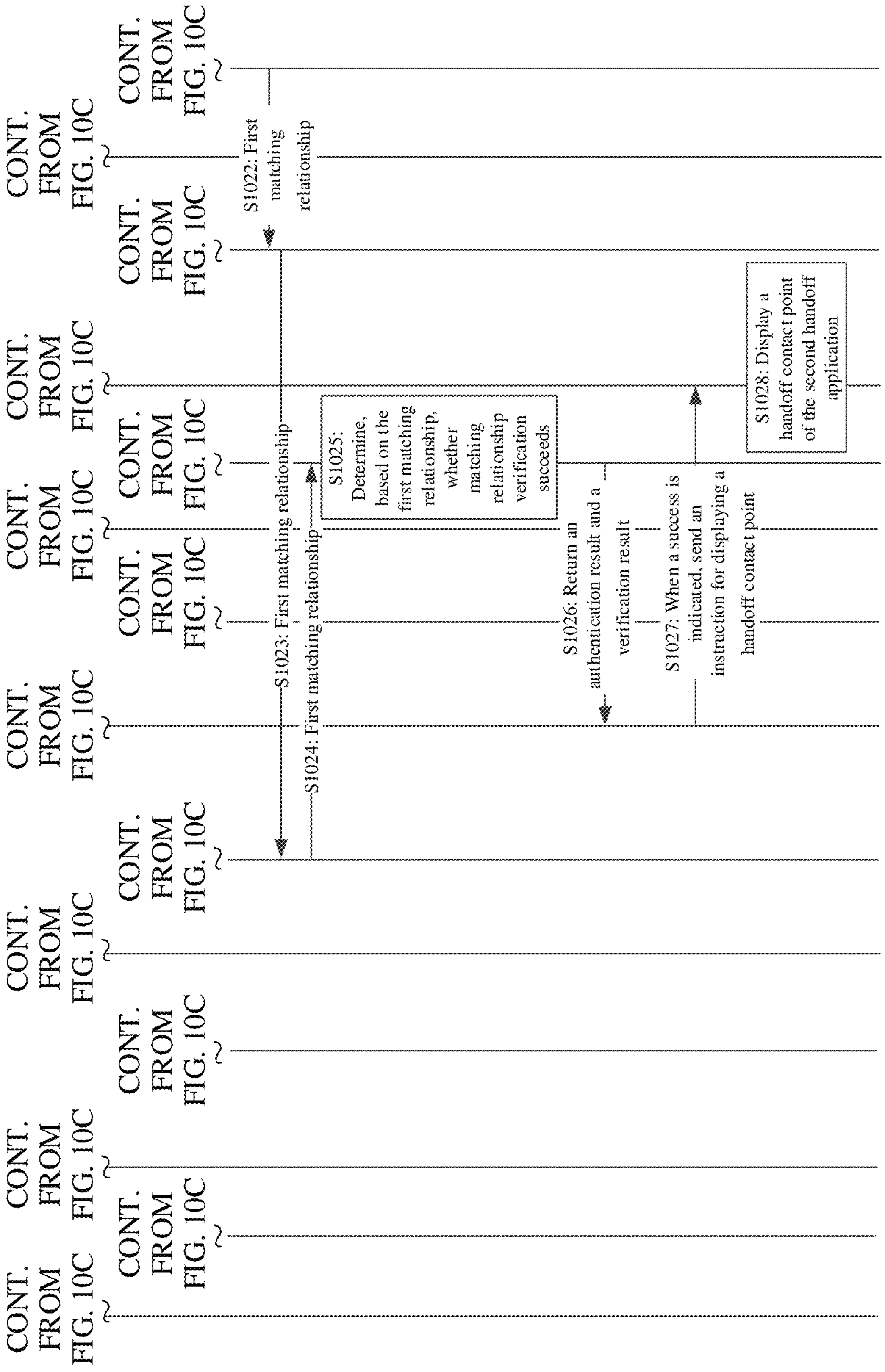

First, the first phase, that is, registration and binding of a handoff application, is described with reference to FIG. 9A and FIG. 9B. FIG. 9A and FIG. 9B are a schematic flowchart of a method 900 for registering and binding a handoff application according to an embodiment of this application. The method 900 may include the following steps.

S901: The first handoff application determines whether a current handoff scenario is a first valid handoff scenario.

S902: When the current handoff scenario is the first valid handoff scenario, the first handoff application sends a handoff service registration request to the first handoff service SDK, where the handoff service registration request carries a UID and an APPID of the first handoff application; and correspondingly, the first handoff service SDK receives the handoff service registration request.

Specifically, the first valid handoff scenario is determined based on a user behavior performed on the first handoff application. The first handoff service SDK is integrated into the first handoff application. When the first handoff application on the first terminal device detects some user behaviors, the first handoff application may access a handoff service by invoking a registration interface of the first handoff service SDK. The user behavior may be that a user taps an icon of the first handoff application to start the application, may be that a user performs an operation such as editing in the first handoff application, or may be that a user taps a play button in the first handoff application to perform an operation such as video playback, music playback, or another media playback. A specific detected user behavior may be customized by the handoff application. This is not limited in this embodiment of this application.

For example, when the first handoff application is Notepad, in a possible implementation, a first valid handoff scenario of Notepad may be that in response to a tap operation performed by the user on an application icon of Notepad, the Notepad application is in a started state; or in another possible implementation, a first valid handoff scenario of Notepad may alternatively be that in response to an input operation performed by the user in Notepad, Notepad is currently in an editing state.

S903: The first handoff service SDK sends the handoff service registration request to the first handoff service manager; and correspondingly, the first handoff service manager receives the handoff service registration request.

S904: The first handoff service manager sends a first validity authentication request to the first authentication service manager; and correspondingly, the first authentication service manager receives the first validity authentication request.

Specifically, the first validity authentication request is used to request to perform authentication on the first handoff application, and the first validity authentication request carries the UID (or process information) and the APPID of the first handoff application.

S905: The first authentication service manager determines local identification information of the first handoff application based on the first validity authentication request.

Specifically, the first authentication service manager may determine the local identification information of the first handoff application based on the UID (or the process information) of the first handoff application in the first validity authentication request, where the local identification information includes a package name (or a process name) and a signature of the first handoff application.

For example, when the first handoff application is an application on an Android platform, the first authentication service manager may determine the local identification information of the first handoff application based on the UID of the first handoff application, where the local identification information includes the package name and the signature of the first handoff application. When the first handoff application is an application on a Windows platform, the first authentication service manager may determine the local identification information of the first handoff application based on the process information of the first handoff application, where the local identification information includes the process name and the signature of the first handoff application.

S906: The first authentication service manager sends the first validity authentication request to the first communication service manager; and correspondingly, the first communication manager receives the first validity authentication request.

S907: The first communication service manager sends the first validity authentication request to the third communication service manager; and correspondingly, the third communication service manager receives the first validity authentication request.

S908: The third communication service manager sends the first validity authentication request to the third authentication service module; and correspondingly, the third authentication service module receives the first validity authentication request.

S909: The third authentication service module obtains cloud identification information of the first handoff application based on the first validity authentication request.

Specifically, the third authentication service module may obtain the cloud identification information of the first handoff application based on the APPID of the first handoff application in the first validity authentication request, where the cloud identification information includes a package name (or a process name) and a signature of the first handoff application.

It should be understood that the cloud identification information is stored in the cloud server when the foregoing handoff permission application process is performed for the first handoff application.

S910: The third authentication service module sends the cloud identification information of the first handoff application to the third communication service manager; and correspondingly, the third communication service manager receives the cloud identification information of the first handoff application.

S911: The third communication service manager sends the cloud identification information of the first handoff application to the first communication service manager; and correspondingly, the first communication service manager receives the cloud identification information of the first handoff application.

S912: The first communication service manager sends the cloud identification information of the first handoff application to the first authentication service manager; and correspondingly, the first authentication service manager receives the cloud identification information of the first handoff application.

S913: The first authentication service manager compares the cloud identification information with the local identification information of the first handoff application, and determines a validity authentication result of the first handoff application based on whether the cloud identification information and the local identification information match.

It should be understood that the validity authentication result may include that the authentication succeeds and the authentication fails. Herein, that the cloud identification information and the local identification information match may be that the cloud identification information and the local identification information are the same. When the cloud identification information and the local identification information are the same, the first authentication service manager determines that the validity authentication on the first handoff application succeeds. Otherwise, the first authentication service manager determines that the validity authentication on the first handoff application fails.

S914: The first authentication service manager sends the validity authentication result of the first handoff application to the first handoff service manager; and correspondingly, the first handoff service manager receives the validity authentication result of the first handoff application.

S915: The first handoff service manager sends the validity authentication result of the first handoff application to the first handoff application; and correspondingly, the first handoff application receives the validity authentication result of the first handoff application.

It should be understood that when the validity authentication result of the first handoff application is that the authentication succeeds, handoff service registration of the first handoff application succeeds, and the first handoff application has a capability of sending a broadcast handoff notification. Otherwise, handoff service registration of the first handoff application fails, and the first handoff application does not have a capability of sending a broadcast handoff notification.

It should be further understood that S905 may be performed in a time period after S904 and before S913. This is not limited in this application.

After handoff service registration of the first handoff application succeeds, the first communication service manager and the second communication service manager may perform self-discovery and ad hoc networking, and perform account authentication by using Bluetooth or WIFI. Further, the first communication service manager may send information used to indicate that the second terminal device is online to the first handoff service manager. For example, the information used to indicate that the second terminal device is online may include information such as a device identifier (device identification, DevID) of the second terminal device.

After receiving the information that is sent by the first communication service manager and that is used to indicate that the second terminal device is online, the first handoff service manager may store and manage the information about the second terminal device, to perform a subsequent application handoff procedure.

Then, the second phase, that is, display of a handoff notification, is described with reference to FIG. 10A, FIG. 10B, FIG. 10C, and FIG. 10D or FIG. 11A, FIG. 11B, and FIG. 11C. FIG. 10A, FIG. 10B, FIG. 10C, and FIG. 10D are a schematic flowchart of a method 1000 for displaying a handoff notification according to an embodiment of this application. The method 1000 may include the following steps.

S1001: The first handoff application determines whether a current handoff scenario is a second valid handoff scenario.

Specifically, the second valid handoff scenario is similar to the first valid handoff scenario. Details are not described herein. The second valid handoff scenario may be the same as or different from the first valid handoff scenario. This is not limited in this application.

In a possible implementation, both the second valid handoff scenario and the first valid handoff scenario may be that the first handoff application is in a started state. In another possible implementation, the first valid handoff scenario may be that the first handoff application is in a started state, and the second valid handoff scenario may be that the first handoff application is in an editing state.

S1002: When the current handoff scenario is the second valid handoff scenario, the first handoff application sends a broadcast handoff notification to a first handoff service SDK; and correspondingly, the first handoff service SDK receives the broadcast handoff notification.

Specifically, the broadcast handoff notification may carry the APPID of the first handoff application and a handoff policy.

It should be understood that the handoff policy is used to determine a device that can perform handoff, and each application program may correspond to a respective handoff policy. For example, the handoff policy of the application program may be related to one or more of the following fields:

a handoff status identifier, a device type supported by the application program, an APPID of a target handoff application, a package name or a process name of the target handoff application, an application market release policy of the second handoff application, a browser start parameter, a minimum version that supports handoff, and the like.

The handoff status identifier may be a flag bit used to identify a handoff policy status. For example, when the flag bit is 0, it may indicate that handoff is not supported, when the flag bit is 1, it may indicate application handoff, and when the flag bit is 3, it may indicate browser handoff. It may be understood that a specific value of the flag bit may be arbitrarily set, provided that different statuses can be distinguished. This is not specifically limited in this embodiment of this application.

For example, when the handoff policy includes the device type supported by the application program, for example, the handoff policy includes that the second handoff application can support a handoff service on a mobile phone, a tablet computer, a television, or a computer, the first handoff service manager may indicate, when the first handoff service manager determines that the second terminal device is a mobile phone, a tablet computer, a television, or a computer, the first communication service manager and the second communication service manager to establish a session path.

If the target handoff application is an application on the Android platform, the handoff policy includes a package name of the target handoff application on the Android platform. If the target handoff application is an application on the Windows platform, the handoff policy includes a process name that is of the target handoff application on the Windows platform and that indicates that handoff can be performed.

The application market release policy may be any one of the following: not released, an overseas application market 1, a domestic application market 1, a domestic application market 2, and an overseas application market 2.

The minimum version that supports application handoff may be represented by a minimum version number that supports application handoff, and is used to indicate a minimum version existing when the second handoff application can be handed off. For example, if the handoff policy includes that the first handoff application can support a minimum version number V1.5 or a minimum version 15, when the first handoff service manager determines that a version number of the second handoff application is greater than or equal to V1.5 or a version of the second handoff application is greater than or equal to 15, the first handoff service manager may indicate the first communication service manager and the second communication service manager to establish a session path.

It should be understood that there may be at least one target handoff application. For example, when the first terminal device and a plurality of terminal devices including the second terminal device are located in a same local area network, and a same account is logged in, there may be a plurality of target handoff applications in the broadcast handoff notification.

For example, the user logs in to a same account on a mobile phone, a tablet computer, and a computer. If the mobile phone, the tablet computer, and the computer are located in a same local area network, the mobile phone end used as a transmit end (that is, the first terminal device) may identify that the tablet computer and the computer are online. When Notepad A on the mobile phone end sends the broadcast handoff notification to the tablet computer and the computer, the target handoff application included in the broadcast handoff notification is Notepad B on the tablet computer and Notepad C on the computer.

When the target handoff application includes Notepad B on the tablet computer and Notepad C on the computer, content carried in the handoff policy in the broadcast handoff notification is as follows:

```
"Pad"
{
"PolicyDescription": "0:mute,1:AppHandoff",
"Policy": 1,
"Package": "com.pad.beiwanglu",
"AppId": 220482320,
"AppMarketDescription": "0: not released, 1: overseas GooglePlay, 2: domestic Huawei application market, 3: domestic Honor application market, 4: overseas Honor application market",
"AppMarket": [1,2],
"MinVersionCode": "110100121",
```

-continued

"MinVersion": "11.1.0.121"
}
"Windows"
{
"PolicyDescription": "0:mute,1:AppHandoff,3:WebHandoff",
"Policy": 13,
"Package": "beiwanglu.exe",
"AppId": 202206141,
"AppMarketDescription": "0: not released, 1: overseas GooglePlay, 2: domestic Huawei application market, 3: domestic Honor application market, 4: overseas Honor application market",
"AppMarket": [0],
"MinVersionCode": "110100121",
"MinVersion": "11.1.0.121"
}

S1003: The first handoff service SDK sends the broadcast handoff notification to the first handoff service manager; and correspondingly, the first handoff service manager receives the broadcast handoff notification.

S1004: The first handoff service manager sends the broadcast handoff notification to the first communication service manager; and correspondingly, the first communication service manager receives the broadcast handoff notification.

S1005: The first communication service manager sends the broadcast handoff notification to the second communication service manager; and correspondingly, the second communication service manager receives the broadcast handoff notification.

S1006: The second communication service manager sends the broadcast handoff notification to the second handoff service manager; and correspondingly, the second handoff service manager receives the broadcast handoff notification.

S1007: The second handoff service manager determines the second handoff application based on the broadcast handoff notification.

Specifically, the broadcast handoff notification carries device type information of the target handoff application, and the second handoff service manager may determine the second handoff application from the target handoff application based on the target handoff application and device type information of the second terminal device.

For example, when the target handoff application includes Notepad B on the tablet computer and Notepad C on the computer, and the second terminal device is a tablet computer, the second handoff service manager may determine Notepad B on the tablet computer as the second handoff application.

S1008: The second handoff service manager determines whether the second handoff application is installed on the second terminal device.

Specifically, the second handoff service manager may query whether the second terminal device includes a package name/process name of the second handoff application, and when the second terminal device includes the package name/process name of the second handoff application, determine that the second handoff application is installed on the second terminal device.

S1009: When the second handoff application is installed on the second terminal device, the second handoff service manager sends a second validity authentication request and a matching relationship verification request to the second authentication service manager; and correspondingly, the second authentication service manager receives the second validity authentication request and the matching relationship verification request.

Specifically, the second validity authentication request is used to request to perform authentication on the second handoff application, and the second validity authentication request carries an APPID of the second handoff application. The matching relationship verification request is used to request to verify a matching relationship of the first handoff application, and the matching relationship verification request carries the APPID of the first handoff application.

It should be understood that when the second handoff application is not installed on the second terminal device, the second handoff service manager may indicate the second terminal device to install the second handoff application.

S1010: The second authentication service manager sends the second validity authentication request to the second communication service manager; and correspondingly, the second communication service manager receives the second validity authentication request.

S1011: The second communication service manager sends the second validity authentication request to the third communication service manager; and correspondingly, the third communication service manager receives the second validity authentication request.

S1012: The third communication service manager sends the second validity authentication request to the third authentication service module; and correspondingly, the third authentication service module receives the second validity authentication request.

S1013: The third authentication service module obtains cloud identification information of the second handoff application based on the second validity authentication request.

It should be understood that the cloud identification information includes a package name (or a process name) and a signature of the second handoff application that are stored in the cloud server.

S1014: The third authentication service module returns the cloud identification information to the third communication service manager; and correspondingly, the third communication service manager receives the cloud identification information.

S1015: The third communication service manager returns the cloud identification information to the second communication service manager; and correspondingly, the second communication service manager receives the cloud identification information.

S1016: The second communication service manager returns the cloud identification information to the second authentication service manager; and correspondingly, the second authentication service manager receives the cloud identification information.

S1017: The second authentication service manager compares the cloud identification information with local identification information, and determines a validity authentication result of the second handoff application based on whether the cloud identification information matches the local identification information.

Specifically, the local identification information is a package name (or a process name) and a signature of the second handoff application that are stored in the second terminal device, the broadcast handoff notification carries the package name/process name of the second handoff application, and the second authentication service manager may obtain the signature of the second handoff application by using the package name/process name of the second handoff application.

For example, when the second handoff application is an application on the Android platform, the second authentication service manager may obtain the signature of the second handoff application by using the package name of the second handoff application. When the second handoff application is an application on the Windows platform, the second authentication service manager may obtain an installation path of the second handoff application from registry information RegRoot and RegKey by using the process name of the second handoff application, splice a relative path described by "ImagePath", find a main process of the second handoff application, and then read the signature of the second handoff application.

It should be understood that the validity authentication result of the second handoff application is similar to the validity authentication result of the first handoff application. Details are not described herein.

S1018: The second authentication service manager sends the matching relationship verification request to the second communication service manager; and correspondingly, the second communication service manager receives the matching relationship verification request.

S1019: The second communication service manager sends a matching relationship query request to the third communication service manager based on the matching relationship verification request; and correspondingly, the third communication service manager receives the matching relationship query request.

Specifically, the matching relationship query request carries the APPID of the first handoff application.

S1020: The third communication service manager sends the matching relationship query request to the matching verification module; and correspondingly, the matching verification module receives the matching relationship query request.

S1021: The matching verification module obtains a first matching relationship through query based on the matching relationship query request.

It should be understood that by using the foregoing method for establishing a matching relationship between applications in the cloud server, the matching verification module stores a matching relationship between applications. The first handoff application may have a matching relationship or may have no matching relationship with at least one handoff application. This is not limited in this application.

Specifically, the matching verification module may query, based on the APPID of the first handoff application, an application that has a matching relationship with the first handoff application, to obtain at least one application that has a matching relationship with the first handoff application.

S1022: The matching verification module returns the first matching relationship to the third communication service manager; and correspondingly, the third communication service manager receives the first matching relationship.

S1023: The third communication service manager returns the first matching relationship to the second communication service manager; and correspondingly, the second communication service manager receives the first matching relationship.

S1024: The second communication service manager returns the first matching relationship to the second authentication service manager; and correspondingly, the second authentication service manager receives the first matching relationship.

S1025: The second authentication service manager performs matching relationship verification based on the first matching relationship, that is, determines whether there is a matching relationship between the first handoff application and the second handoff application.

Specifically, the first matching relationship includes two cases, and the performing matching relationship verification based on the first matching relationship also includes two cases.

In one case, the first matching relationship is used to indicate at least one application capable of being handed off with the second handoff application. In this case, the determining whether there is a matching relationship between the first handoff application and the second handoff application may be: determining whether the at least one application that has a matching relationship with the second handoff application includes the first handoff application. When the at least one application that has a matching relationship with the second handoff application includes the first handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

In another case, the first matching relationship is used to indicate at least one application capable of being handed off with the first handoff application. In this case, the determining whether there is a matching relationship between the first handoff application and the second handoff application may be: determining whether the at least one application that has a matching relationship with the first handoff application includes the second handoff application. When the at least one application that has a matching relationship with the first handoff application includes the second handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

S1026: The second authentication service manager returns the validity authentication result and a matching relationship verification result to the second handoff service manager; and correspondingly, the second handoff service manager receives the validity authentication result and the matching relationship verification result.

Specifically, the validity authentication result includes that the authentication succeeds or the authentication fails, and the matching relationship verification result includes that the verification succeeds or the verification fails.

S1027: When both the validity authentication result and the matching relationship verification result indicate a success, the second handoff service manager sends, to the desktop launcher, an instruction for displaying a handoff contact point.

S1028: The desktop launcher controls display of a handoff contact point of the second handoff application. The handoff contact point may be displayed in a form of an icon of the second handoff application.

It should be understood that steps S1011 to S1017 and steps S1018 to S1025 may not be performed in a particular sequence, and may be simultaneously performed, or S1018 to S1025 may be performed first, and then S1011 to S1017 are performed. This is not limited in this embodiment of this application.

FIG. 10A, FIG. 10B, FIG. 10C, and FIG. 10D show a procedure of displaying a handoff notification when a matching relationship between applications is established and stored in the cloud server. If an application developer predefines a matching relationship between the second handoff application and another application in an installation package of the second handoff application, the second terminal device may obtain the first matching relationship after the second handoff application is installed, and does not need to make a query to the cloud server. With reference to FIG. 10A, FIG. 10B, FIG. 10C, and FIG. 10D, the following describes a procedure of displaying a handoff notification in this case.

Figure 11A:
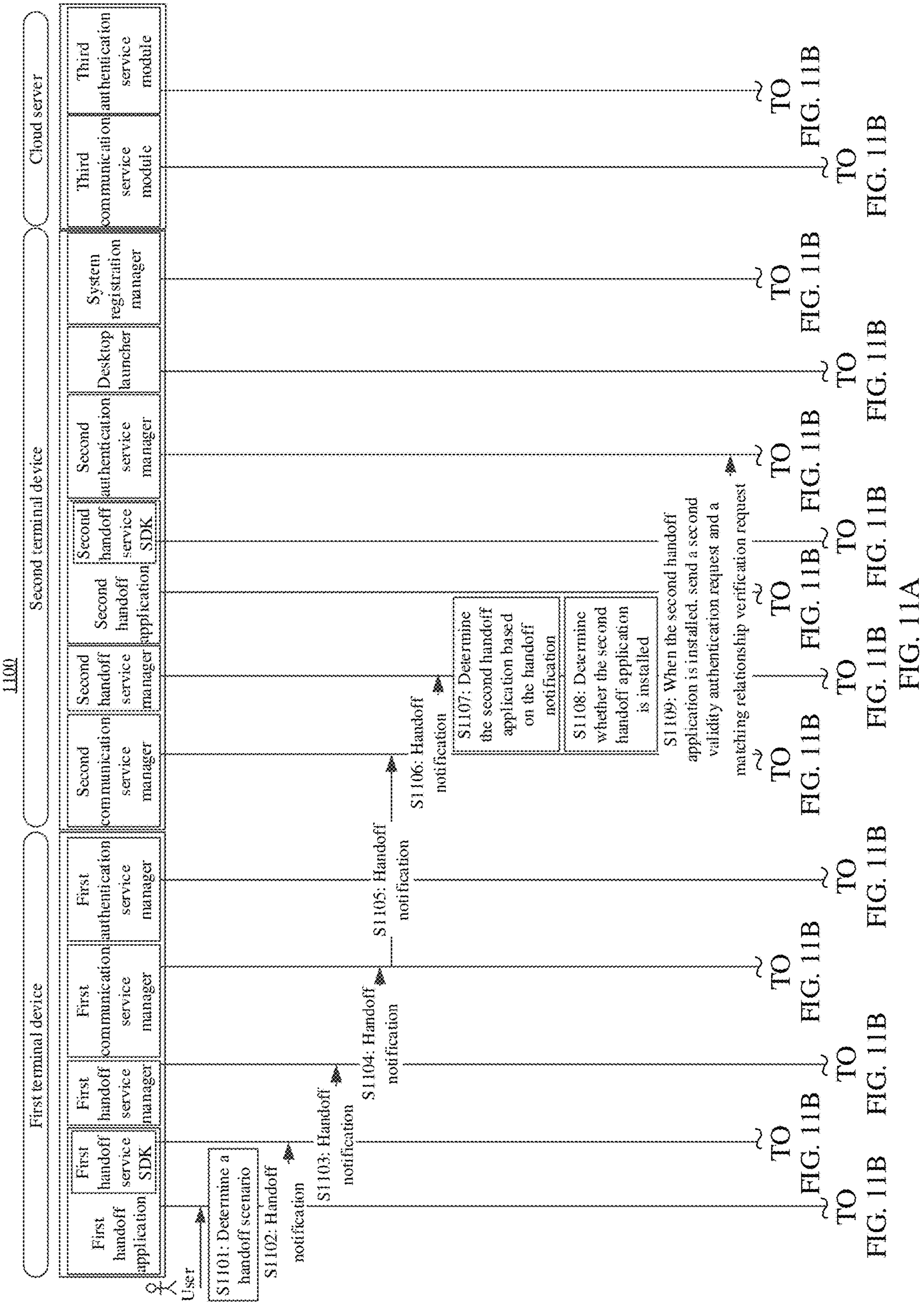
FIG. 11A, FIG. 11B, and FIG. 11C are a schematic flowchart of another method for displaying a handoff notification according to an embodiment of this application.
Figure 11B:
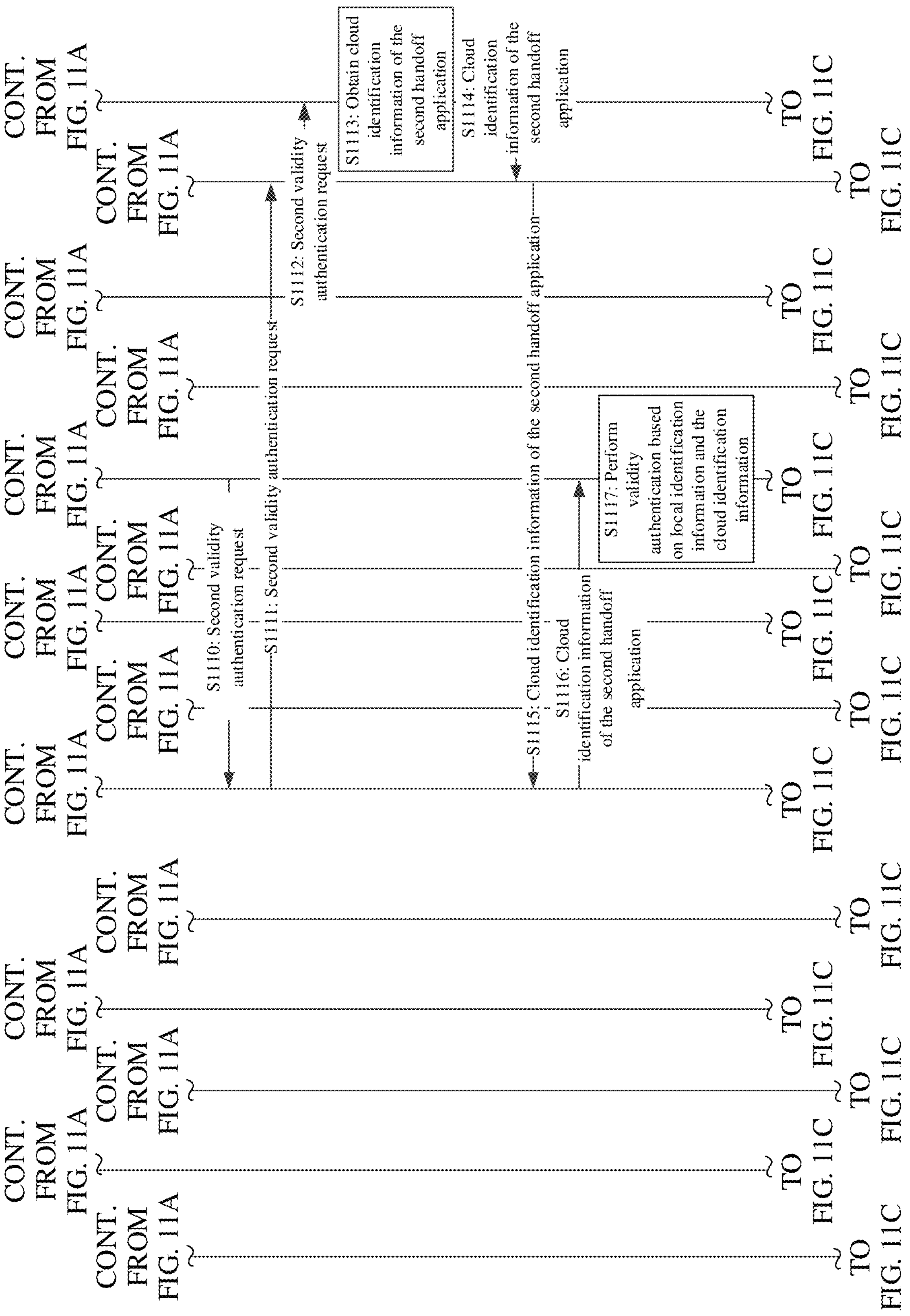
Figure 11C:
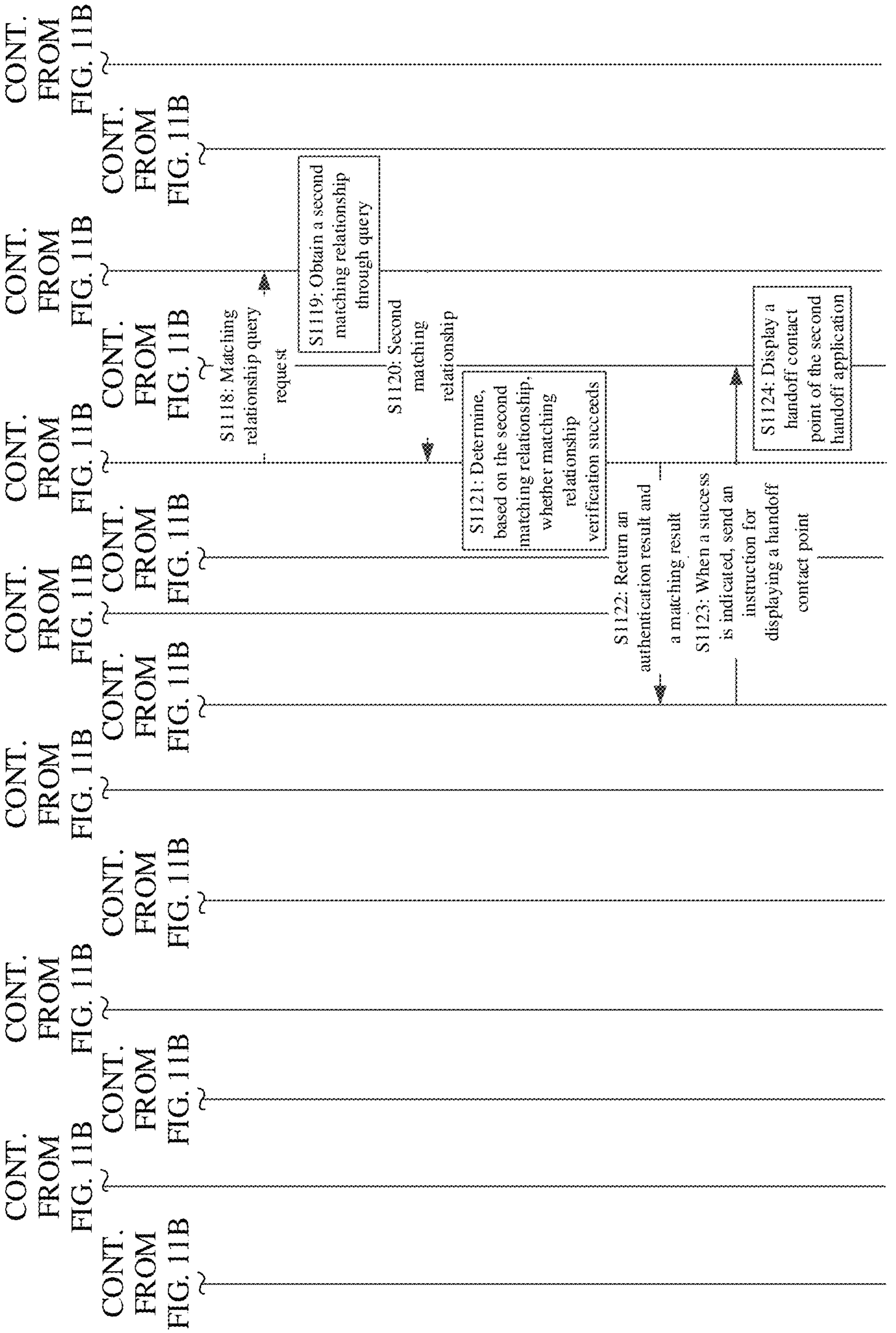

FIG. 11A, FIG. 11B, and FIG. 11C are a schematic flowchart of another method 1100 for displaying a handoff notification according to an embodiment of this application. An application program framework layer of a software structure of the second terminal device further includes a system registration manager, configured to store a matching relationship between applications during handoff.

The method 1100 is similar to the method 1000. S1101 to S1117 are the same as steps S1001 to S1017. Details are not described herein.

S1118: The second authentication service manager sends a matching relationship verification request to the system registration manager; and correspondingly, the system registration manager receives the matching relationship verification request.

S1119: The system registration manager obtains a second matching relationship through query based on the matching relationship verification request.

It should be understood that if the application developer predefines the matching relationship (that is, the second matching relationship) between the second handoff application and another application in the installation package of the second handoff application, when the second handoff application is installed, the second terminal device parses the installation package of the second handoff application to obtain the second matching relationship, and stores the second matching relationship in the system registration manager.

S1120: The system registration manager sends the first matching relationship to the second authentication service manager; and correspondingly, the second authentication service manager receives the second matching relationship.

S1121: The second authentication service manager performs matching relationship verification based on the second matching relationship, that is, determines whether there is a matching relationship between the first handoff application and the second handoff application.

Specifically, the second matching relationship is used to indicate at least one application capable of being handed off with the second handoff application. The determining whether there is a matching relationship between the first handoff application and the second handoff application may be: determining whether the at least one application that has a matching relationship with the second handoff application includes the first handoff application. When the at least one application that has a matching relationship with the second handoff application includes the first handoff application, it is considered that there is a matching relationship between the first handoff application and the second handoff application, and the matching relationship verification succeeds. Otherwise, it is considered that there is no matching relationship between the first handoff application and the second handoff application, and the matching relationship verification fails.

S1122~S1124 are the same as steps S1026~S1028. Details are not described herein.

Finally, the third phase, that is, obtaining and loading of handoff data, is described with reference to FIG. 12A and FIG. 12B.

Figure 12A:
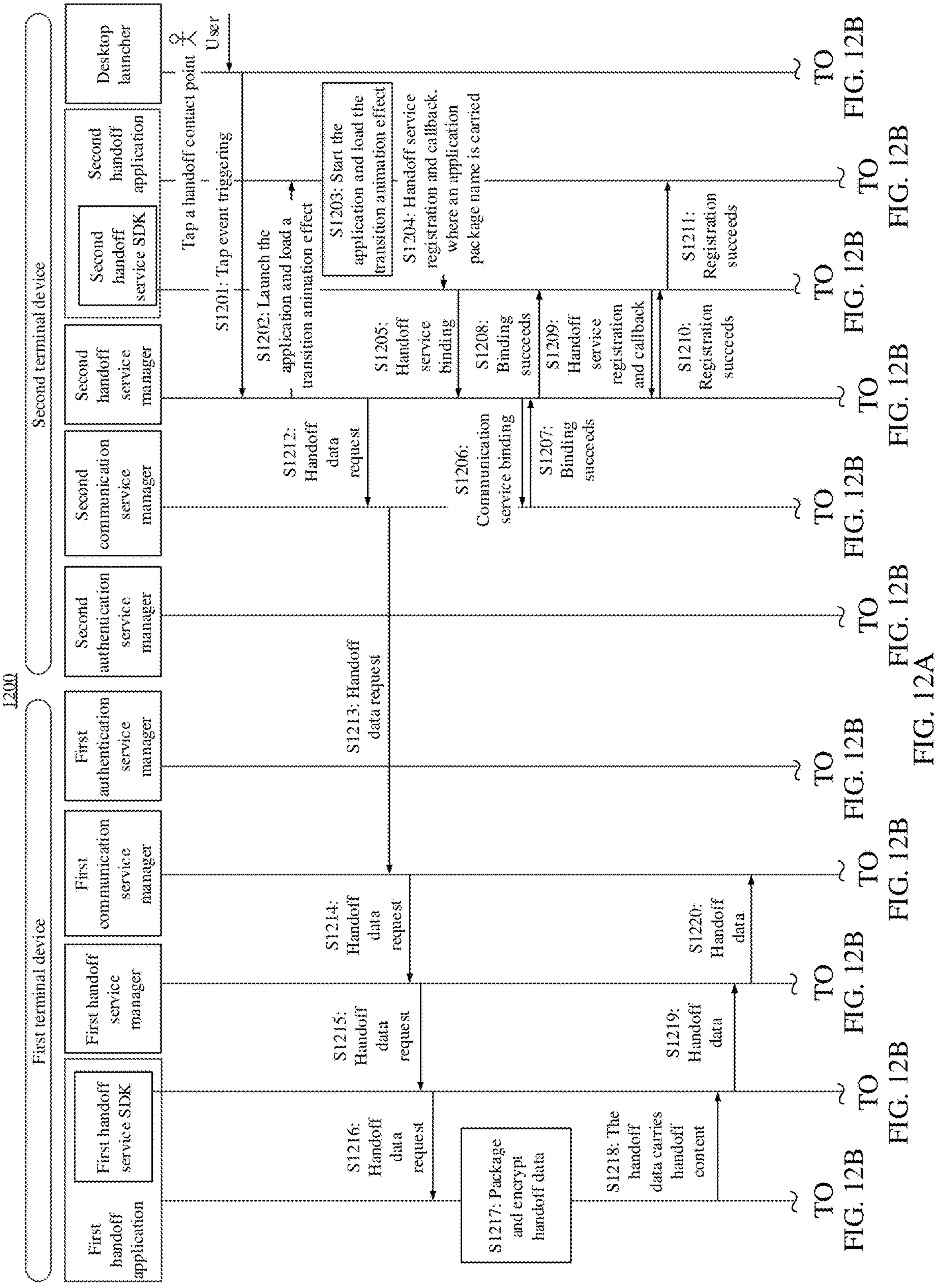
FIG. 12A and FIG. 12B are a schematic flowchart of a method for obtaining and loading handoff data according to an embodiment of this application.
Figure 12B:
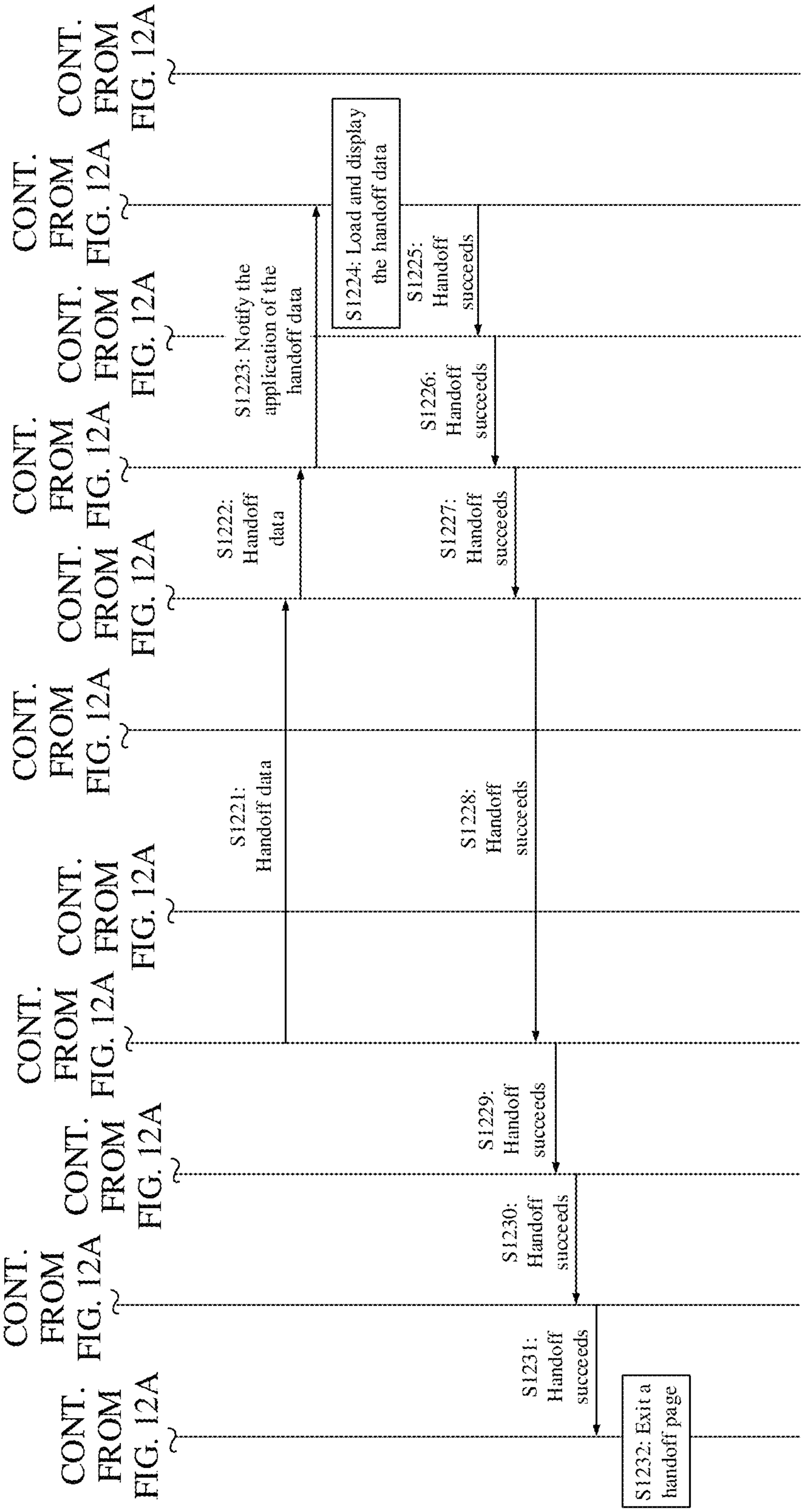

FIG. 12A and FIG. 12B are a schematic flowchart of a method 1200 for obtaining and loading handoff data according to an embodiment of this application. The method 1200 includes the following steps.

S1201: The desktop launcher sends an event triggering instruction to the second handoff service manager in response to an operation of tapping the handoff contact point by the user.

S1202: The second handoff service manager may launch the second handoff application, to indicate the second handoff application to load a transition animation effect.

S1203: The second handoff application may start and load the transition animation effect.

Specifically, the transition animation effect may include, for example, prompt information such as "loading . . . ".

S1204: The second handoff application invokes the second handoff service SDK to perform handoff service registration and callback.

It should be understood that when performing handoff service registration, the second handoff application may carry information such as an application package name of the second handoff application.

S1205: The second handoff service SDK sends a handoff service binding request to the second handoff service manager; and correspondingly, the second handoff service manager receives the handoff service binding request.

S1206: The second handoff service manager sends a communication service binding request to the second communication service manager; and correspondingly, the second communication service manager receives the communication service binding request.

S1207: After the second communication service manager successfully performs binding, the second communication service manager sends a binding success message to the second handoff service manager; and correspondingly, the second handoff service manager receives the binding success message.

S1208: The second handoff service manager sends the binding success message to the second handoff service SDK; and correspondingly, the second handoff service SDK receives the binding success message.

S1209: The second handoff service SDK sends a handoff service registration and callback request to the second handoff service manager; and correspondingly, the second handoff service manager receives the handoff service registration and callback request.

S1210: After successfully performing registration, the second handoff service manager sends a registration success message to the second handoff service SDK; and correspondingly, the second handoff service SDK receives the registration success message.

S1211: The second handoff service SDK sends the registration success message to the second handoff application; and correspondingly, the second handoff application receives the registration success message.

S1212: After S1201, the second handoff service manager sends a handoff data request to the second communication service manager; and correspondingly, the second communication service manager receives the handoff data request.

S1213: The second communication service manager sends the handoff data request to the first communication service manager; and correspondingly, the first communication service manager receives the handoff data request.

S1214: The first communication service manager sends the handoff data request to the first handoff service manager; and correspondingly, the first handoff service manager receives the handoff data request.

S1215: The first handoff service manager sends the handoff data request to the first handoff service SDK; and correspondingly, the first handoff service SDK receives the handoff data request.

S1216: The first handoff service SDK sends the handoff data request to the first handoff application; and correspondingly, the first handoff application receives the handoff data request.

S1217: The first handoff application packages and encrypts handoff data.

S1218: The first handoff application sends the handoff data to the first handoff service SDK; and correspondingly, the first handoff service SDK receives the handoff data.

S1219: The first handoff service SDK sends the handoff data to the first handoff service manager; and correspondingly, the first handoff service manager receives the handoff data.

S1220: The first handoff service manager sends the handoff data to the first communication service manager; and correspondingly, the first communication service manager receives the handoff data.

S1221: The first communication service manager sends the handoff data to the second communication service manager; and correspondingly, the second communication service manager receives the handoff data.

S1222: The second communication service manager sends the handoff data to the second handoff service manager; and correspondingly, the second handoff service manager receives the handoff data.

S1223: The second handoff service manager sends the handoff data to the second handoff application; and correspondingly, the second handoff application receives the handoff data.

S1224: The second handoff application loads and displays the handoff data.

S1225: The second handoff application sends a handoff success message to the second handoff service SDK; and correspondingly, the second handoff service SDK receives the handoff success message.

S1226: The second handoff service SDK sends the handoff success message to the second handoff service manager; and correspondingly, the second handoff service manager receives the handoff success message.

S1227: The second handoff service manager sends the handoff success message to the second communication service manager; and correspondingly, the second communication service manager receives the handoff success message.

S1228: The second communication service manager sends the handoff success message to the first communication service manager; and correspondingly, the first communication service manager receives the handoff success message.

S1229: The first communication service manager sends the handoff success message to the first handoff service manager; and correspondingly, the first handoff service manager receives the handoff success message.

S1230: The first handoff service manager sends the handoff success message to the first handoff service SDK; and correspondingly, the first handoff service SDK receives the handoff success message.

S1231: The first handoff service SDK sends the handoff success message to the first handoff application; and correspondingly, the first handoff application receives the handoff success message.

S1232: The first handoff application exits a handoff page.

It should be noted that in the application handoff method in the embodiments of this application, if the first handoff application has already performed handoff service registration and binding, when the first handoff application on the first terminal device detects some user behaviors, the first handoff application does not need to perform handoff service registration again, or it is understood as that the method 900 does not need to be performed, and the first handoff application may directly perform the method 1000 or 1100, the method 1200, and the like. Details are not described herein.

The methods shown in FIG. 9A and FIG. 9B to FIG. 12A and FIG. 12B may be applied to the application scenario 100 shown in FIG. 1. A hardware structure of the involved terminal device may be shown in FIG. 2, and a software structure may be shown in FIG. 3A and FIG. 3B or FIG. 4A and FIG. 4B. However, the embodiments of this application are not limited thereto.

An entire procedure of the application handoff method provided in this application is described above with reference to FIG. 9A and FIG. 9B to FIG. 12A and FIG. 12B. The following describes an application handoff interface between a first terminal device and a second terminal device in the application handoff method with reference to FIG. 13, FIG. 14A, FIG. 14B, and FIG. 14C.

An example in which the first terminal device (that is, a source device) is a mobile phone, the second terminal device (that is, a peer device) is a tablet computer, and a handoff application is Notepad is used below for description. The mobile phone and the tablet computer are located in a same local area network, and a same account is logged in on Notepad on the mobile phone and Notepad on the tablet computer.

Figure 13:
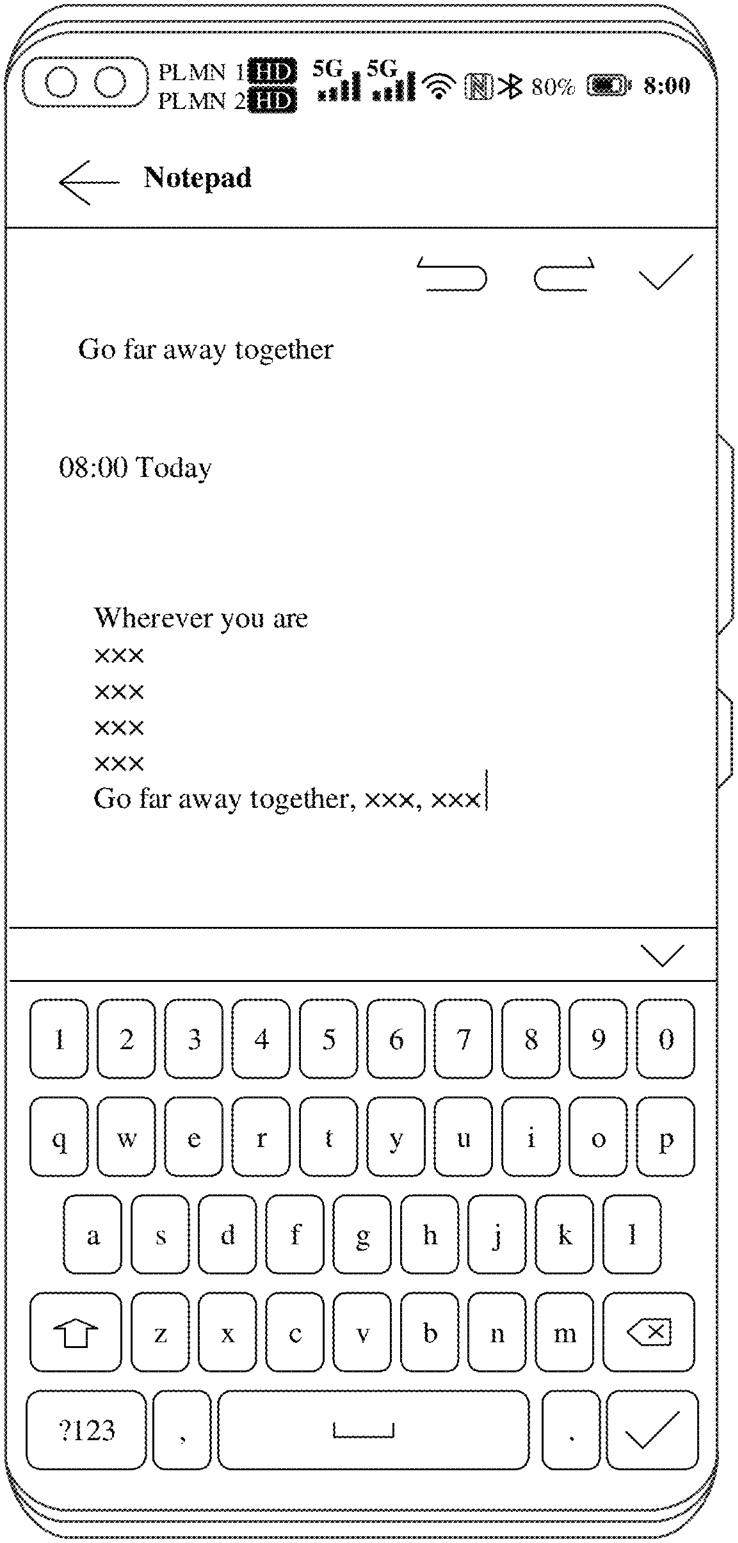
FIG. 13 is a schematic diagram of an interface of a source device in an application handoff method according to this application.

FIG. 13 is a schematic diagram of an interface of the source device in the application handoff method according to this application, and is used to describe, in response to a user operation, an interface of the mobile phone used as the source device. In the interface shown in FIG. 13, a user is editing text in Notepad on the mobile phone, the mobile phone correspondingly displays the text edited by the user, and a position of a cursor changes with a position at which the user performs editing. Notepad on the mobile phone is in an editing state, and the mobile phone sends a broadcast handoff notification of Notepad on the mobile phone to the tablet computer.

Figures 14A, 14B:
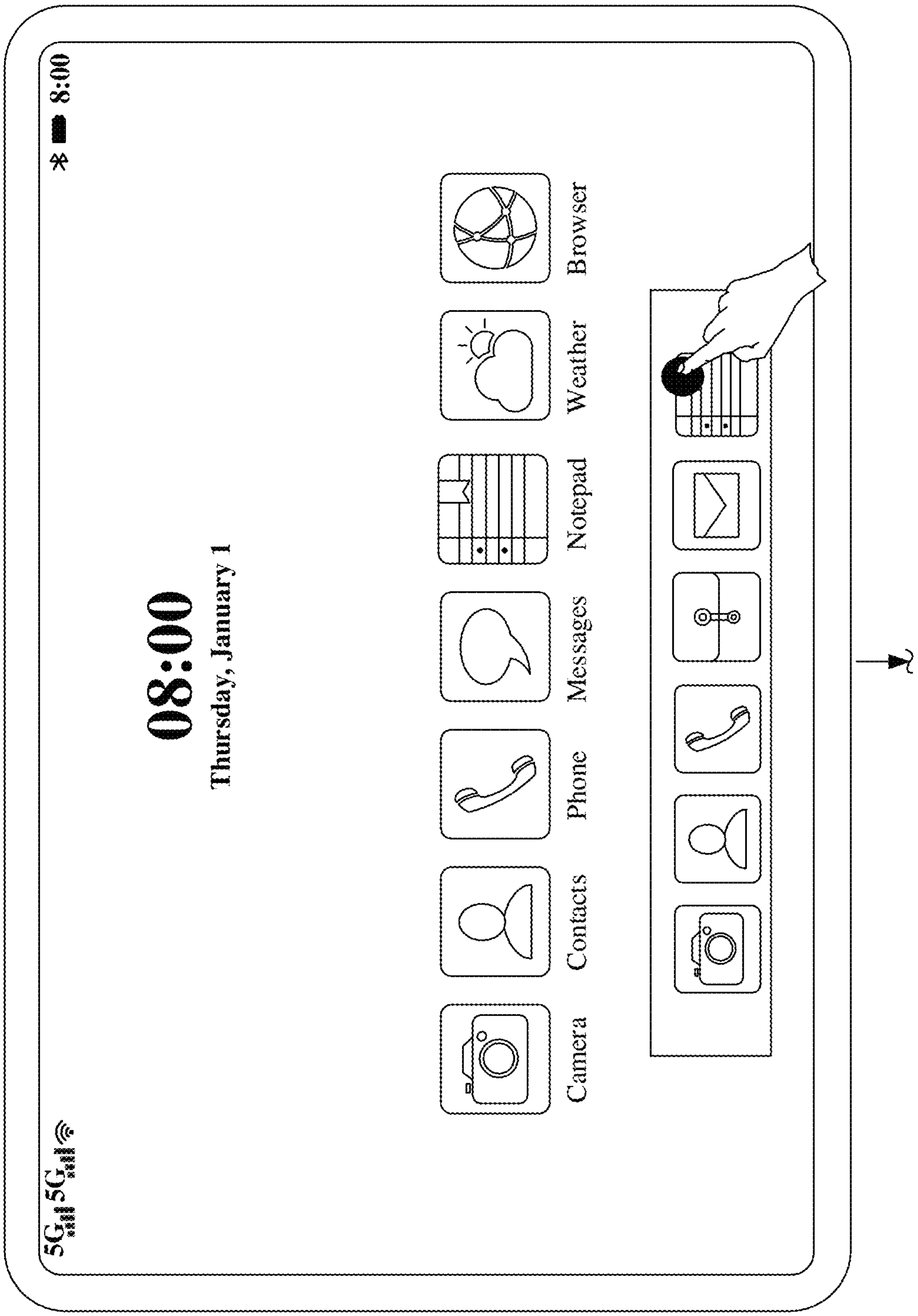
FIG. 14A, FIG. 14B, and FIG. 14C are a schematic diagram of an interface of a peer device in an application handoff method according to this application.
Figure 14B:
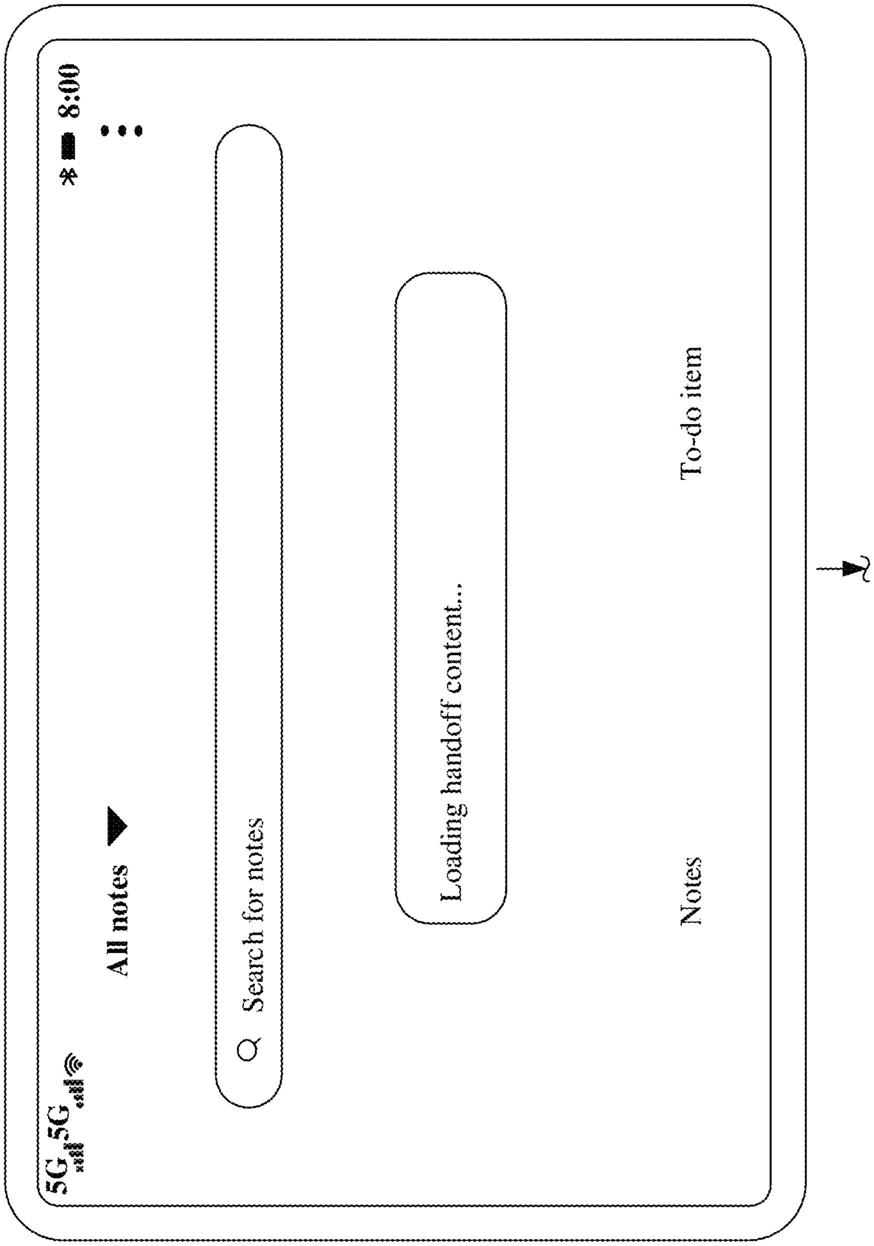
Figure 14C:
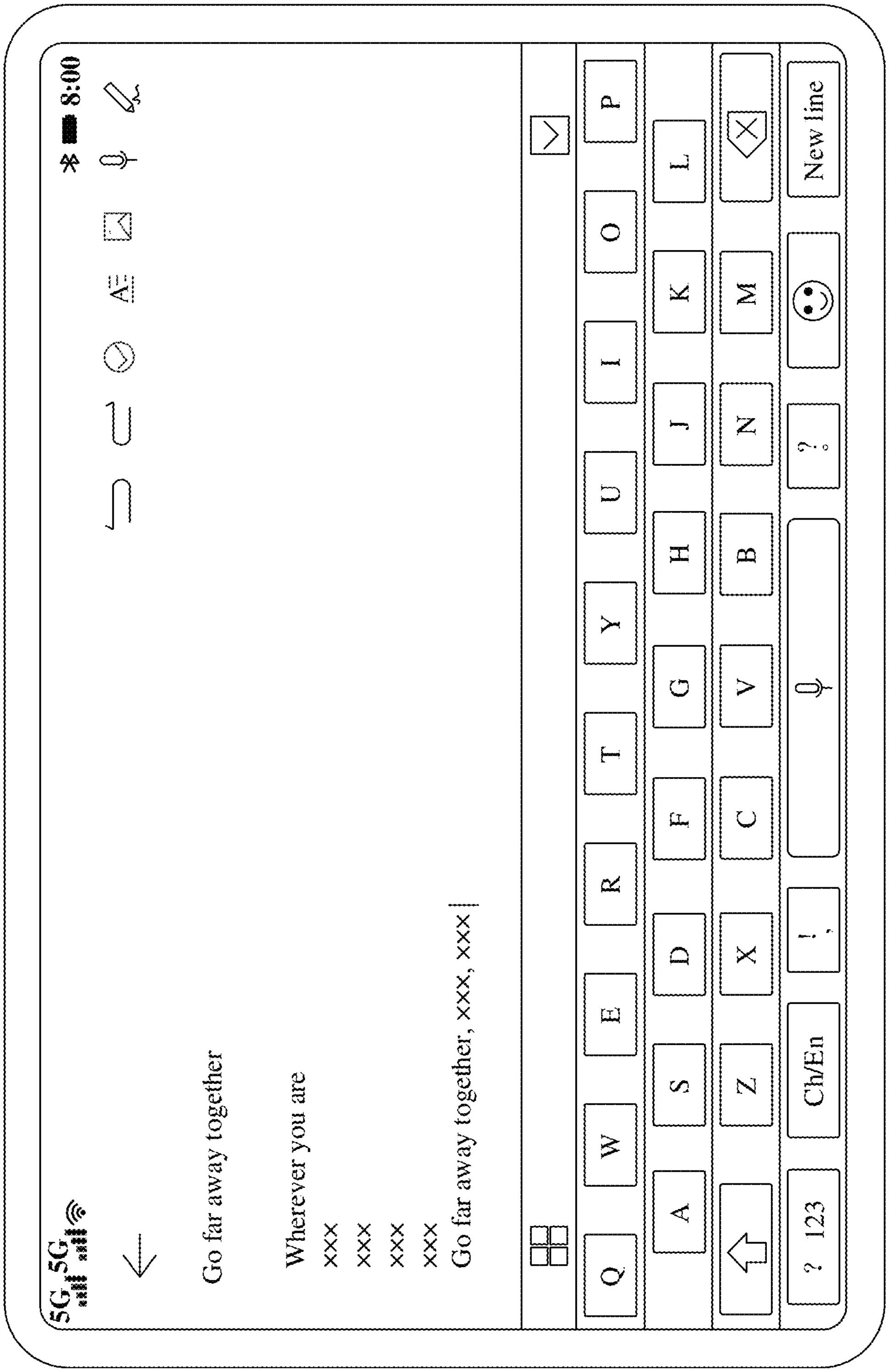

FIG. 14A, FIG. 14B, and FIG. 14C are a schematic diagram of an interface change of the peer device according to an embodiment of this application, and is used to describe, in response to a user operation, an interface change of the tablet computer used as the peer device. In an interface in FIG. 14A, a recent taskbar is displayed at a lower part of a desktop of the tablet computer, and the recent taskbar includes a Notepad icon and a plurality of other application icons. The tablet computer receives the broadcast handoff notification from the mobile phone, and displays a contact point (for example, a black dot in FIG. 14A) in an upper right corner of the Notepad icon in the recent taskbar, to prompt the user that Notepad on the mobile phone wants to be handed off with Notepad on the tablet computer. The user taps the touch point, and the tablet computer displays an interface in FIG. 14B in response to the tap operation performed by the user. In the interface in FIG. 14B, a page of Notepad is displayed, and "loading handoff content" is displayed on the page of Notepad. After the content is loaded, an interface in FIG. 14C is displayed. In the interface in FIG. 14C, same Notepad content and a same cursor position as those on the mobile phone are displayed.

The foregoing describes in detail the application handoff method in the embodiments of this application with reference to FIG. 6A, FIG. 6B, FIG. 6C, and FIG. 6D to FIG. 14A, FIG. 14B, and FIG. 14C. The following describes in detail a terminal device in the embodiments of this application with reference to FIG. 15 and FIG. 16.

Figure 15:
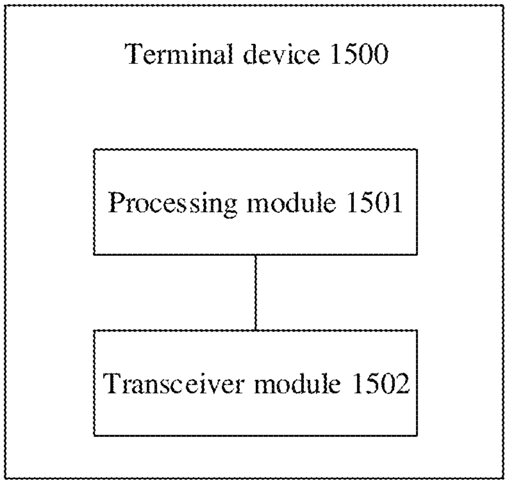
FIG. 15 is a schematic block diagram of a terminal device according to an embodiment of this application.

FIG. 15 shows a terminal device 1500 according to an embodiment of this application. The terminal device 1500 includes a processing module 1501 and a transceiver module 1502. The terminal device 1500 is configured to implement the steps corresponding to the second terminal device in the foregoing method.

The transceiver module 1502 is configured to receive a broadcast handoff notification from a first terminal device, where the broadcast handoff notification is used to request to hand off a first handoff application on the first terminal device to the terminal device. The processing module 1501 is configured to: determine a second handoff application based on the broadcast handoff notification, and perform validity authentication and matching relationship verification on the second handoff application, to obtain a validity authentication result and a matching relationship verification result; and display a handoff contact point of the second handoff application when the validity authentication result is that the validity authentication succeeds, and the matching relationship verification result is that the matching relationship verification succeeds.

Optionally, the broadcast handoff notification includes an application identifier APPID of the first handoff application and a handoff policy; the handoff policy includes at least one of the following: a handoff status identifier, a package name or a process name of at least one target handoff application, a device type of the at least one target handoff application, an application market release policy of the at least one target handoff application, and a minimum version that supports handoff; and the at least one target handoff application includes the second handoff application.

Optionally, the processing module 1501 is further configured to determine an application that is in the at least one target handoff application and that is of a same device type as the terminal device as the second handoff application based on the device type of the at least one target handoff application.

Optionally, the transceiver module 1502 is further configured to: send a validity authentication request to a cloud server, where the validity authentication request carries an APPID of the second handoff application; and receive cloud identification information of the second handoff application from the cloud server, where the cloud identification information includes a package name and/or a signature of the second handoff application that are/is stored in the cloud server; and the processing module 1501 is further configured to compare the cloud identification information with local identification information of the second handoff application, to obtain the validity authentication result, where the local identification information is a package name and/or a signature of the second handoff application that are/is locally stored in the terminal device.

Optionally, the transceiver module 1502 is further configured to: send a matching relationship query request to the cloud server, where the matching relationship query request carries the APPID of the second handoff application; and receive a first matching relationship from the cloud server, where the first matching relationship is used to indicate at least one application capable of being handed off with the second handoff application; and the processing module 1501 is further configured to determine, based on the first matching relationship, whether the at least one application includes the first handoff application, to obtain the matching relationship verification result.

Optionally, the transceiver module 1502 is further configured to: send a matching relationship query request to the cloud server, where the matching relationship query request carries the APPID of the first handoff application; and receive a first matching relationship from the cloud server, where the first matching relationship is used to indicate at least one application capable of being handed off with the first handoff application; and the processing module 1501 is further configured to determine, based on the first matching relationship, whether the at least one application includes the second handoff application, to obtain the matching relationship verification result.

Optionally, the processing module 1501 is further configured to: obtain a second matching relationship, where the second matching relationship is used to indicate at least one application capable of being handed off with the second handoff application, and the second matching relationship is locally stored in advance when the second handoff application is installed on the terminal device; and determine, based on the second matching relationship, whether the at least one application includes the first handoff application, to obtain the matching relationship verification result.

Optionally, the transceiver module 1502 is further configured to: send a handoff data request message to the first terminal device in response to a tap operation performed by a user on the handoff contact point; and receive handoff data from the first terminal device, and display the handoff data.

It should be understood that the terminal device 1500 herein is embodied in a form of a functional module. The term "module" herein may be an application specific integrated circuit (application specific integrated circuit, ASIC), an electronic circuit, a processor (for example, a shared processor, a dedicated processor, or a group processor) configured to execute one or more software or firmware programs, a memory, a combinational logic circuit, and/or another suitable component supporting the described function. In an optional example, a person skilled in the art may understand that the terminal device 1500 may be specifically the second terminal device in the foregoing embodiments, and the terminal device 1500 may be configured to perform the procedures and/or the steps corresponding to the second terminal device in the foregoing method embodiments. To avoid repetition, details are not described herein.

The terminal device 1500 has functions of implementing the corresponding steps performed by the second terminal device in the foregoing method. The functions may be implemented by hardware, or may be implemented by hardware by executing corresponding software. The hardware or software includes one or more modules corresponding to the functions. The transceiver module 1502 may include a sending module and a receiving module, the sending module may be configured to implement the steps and/or the procedures that correspond to the transceiver module and that are used to perform a sending action, and the receiving module may be configured to implement the steps and/or the procedures that correspond to the transceiver module and that are used to perform a receiving action. The sending module may be replaced with a transmitter, and the receiving module may be replaced with a receiver, to separately perform a sending/receiving operation and a related processing operation in each method embodiment.

In this embodiment of this application, the terminal device 1500 in FIG. 15 may alternatively be a chip or a chip system, for example, a system on chip (system on chip, SOC). Correspondingly, the transceiver module 1502 may be a transceiver circuit of the chip. This is not limited herein.

Figure 16:
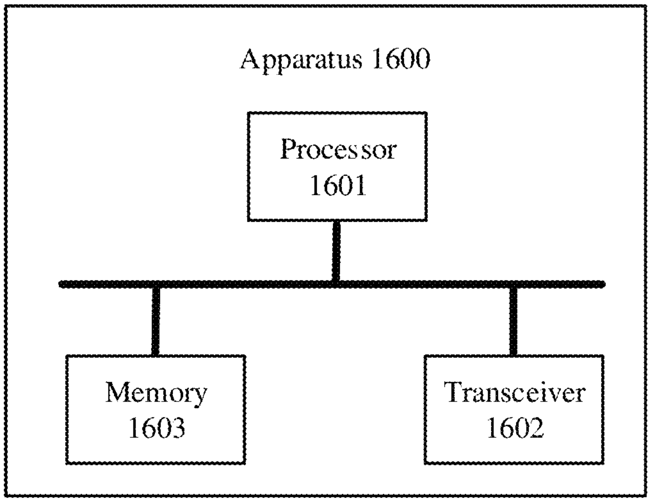
FIG. 16 is a schematic block diagram of another terminal device according to an embodiment of this application.

FIG. 16 shows another terminal device 1600 according to an embodiment of this application. The terminal device 1600 includes a processor 1601, a transceiver 1602, and a memory 1603. The processor 1601, the transceiver 1602, and the memory 1603 communicate with each other through an internal connection path. The memory 1603 is configured to store instructions. The processor 1601 is configured to execute the instructions stored in the memory 1603, to control the transceiver 1602 to send a signal and/or receive a signal.

It should be understood that the terminal device 1600 may be specifically the second terminal device in the foregoing embodiments, and may be configured to perform the steps and/or the procedures corresponding to the second terminal device in the foregoing method embodiments. Optionally, the memory 1603 may include a read-only memory and a random access memory, and provides instructions and data to the processor. A part of the memory may further include a nonvolatile random access memory. For example, the memory may further store information about a device type. The processor 1601 may be configured to execute the instructions stored in the memory, and when the processor 1601 executes the instructions stored in the memory, the processor 1601 is configured to perform the steps and/or the procedures corresponding to the second terminal device in the foregoing method embodiments. The transceiver 1602 may include a transmitter and a receiver, the transmitter may be configured to implement the steps and/or the procedures that correspond to the transceiver and that are used to perform a sending action, and the receiver may be configured to implement the steps and/or the procedures that correspond to the transceiver and that are used to perform a receiving action.

It should be understood that in this embodiment of this application, the processor may be a central processing unit (central processing unit, CPU), and the processor may alternatively be another general-purpose processor, a digital signal processor (DSP), an application specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

In an implementation process, the steps of the foregoing method may be completed by using an integrated logic circuit of hardware in the processor or by using instructions in a form of software. The steps of the method disclosed with reference to the embodiments of this application may be directly performed by a hardware processor, or by a combination of hardware in the processor and a software module. The software module may be located in a storage medium that is mature in the art, for example, a random access memory, a flash memory, a read-only memory, a programmable read-only memory, an electrically erasable programmable memory, or a register. The storage medium is located in the memory. The processor executes the instructions in the memory, and completes the steps of the foregoing method in combination with hardware in the processor. To avoid repetition, details are not described herein.

This application further provides a computer-readable storage medium. The computer-readable storage medium is configured to store a computer program, and the computer program is used to implement the method corresponding to the second terminal device in the foregoing embodiments.

This application further provides a computer program product. The computer program product includes a computer program (which may also be referred to as code or instructions). When the computer program is run on a computer, the computer may perform the method corresponding to the second terminal device shown in the foregoing embodiments.

A person of ordinary skill in the art may be aware that the example modules and algorithm steps described with reference to the embodiments disclosed in this specification can be implemented by using electronic hardware or a combination of computer software and electronic hardware. Whether these functions are performed by hardware or software depends on specific applications and design constraints of the technical solutions. A person skilled in the art may use different methods to implement the described functions for each specific application, but it should not be considered that such an implementation goes beyond the scope of this application.

A person skilled in the art may clearly understand that for case and brevity of description, for a specific operation process of the system, apparatus, and module described above, refer to a corresponding process in the foregoing method embodiments. Details are not described herein.

In several embodiments provided in this application, it should be understood that the disclosed system, apparatus, and method may be implemented in another manner. For example, the apparatus embodiment described above is merely an example. For example, division into the modules is merely logical function division. In an actual implementation, there may be another division manner. For example, a plurality of modules or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or modules may be implemented in an electrical form, a mechanical from, or another form.

The modules described as separate parts may or may not be physically separated, and parts displayed as modules may or may not be physical modules, that is, may be located at one position, or may be distributed on a plurality of network modules. Some or all of the modules may be selected based on an actual requirement, to achieve the objectives of the solutions in the embodiments.

In addition, the functional modules in the embodiments of this application may be integrated into one processing module, or each module may exist alone physically, or two or more modules may be integrated into one module.

When the functions are implemented in a form of a software functional module and sold or used as an independent product, the functions may be stored in a computer-readable storage medium. Based on such an understanding, the technical solutions of this application essentially, or the part contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, and are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

The invention claimed is:

1. An application handoff method, applied to a system comprising a first terminal device, a second terminal device, and a cloud server, wherein a user logs in to a same account on the first terminal device and the second terminal device, the first terminal device and the second terminal device are located in a same local area network, and the method comprises:

receiving, by the second terminal device, a broadcast handoff notification from the first terminal device, wherein the broadcast handoff notification is used to request to hand off a first handoff application on the first terminal device to the second terminal device;

determining, by the second terminal device, a second handoff application based on the broadcast handoff notification;

performing, validity authentication on the second handoff application based on cloud identification information of the second handoff application from the cloud server and local identification information of the second handoff application, to obtain a validity authentication result;

performing, matching relationship verification on the second handoff application based on matching relationship, to obtain a matching relationship verification result, wherein the matching relationship is used to indicate at least one application capable of being handed off with the second handoff application or the matching relationship is used to indicate at least one application capable of being handed off with the first handoff application; and displaying, by the second terminal device, a handoff contact point of the second handoff application when the validity authentication result is that the validity authentication succeeds, and the matching relationship verification result is that the matching relationship verification succeeds, wherein the broadcast handoff notification comprises an application identifier (APPID) of the first handoff application and a handoff policy;

the handoff policy comprises at least one of the following:

a handoff status identifier, a package name or a process name of at least one target handoff application, a device type of the at least one target handoff application, an application market release policy of the at least one target handoff application, and a minimum version that supports handoff; and the at least one target handoff application comprises the second handoff application.

2. The method according to claim 1, wherein the determining, by the second terminal device, a second handoff application based on the broadcast handoff notification comprises:

determining, by the second terminal device, an application that is in the at least one target handoff application and that is of a same device type as the second terminal device as the second handoff application based on the device type of the at least one target handoff application.

3. The method according to claim 1, wherein the performing validity authentication on the second handoff application comprises:

sending, by the second terminal device, a validity authentication request to the cloud server, wherein the validity authentication request carries an APPID of the second handoff application;

receiving, by the second terminal device, the cloud identification information of the second handoff application from the cloud server, wherein the cloud identification information comprises a package name and/or a signature of the second handoff application that are/is stored in the cloud server; and comparing, by the second terminal device, the cloud identification information with the local identification information of the second handoff application, to obtain the validity authentication result, wherein the local identification information is a package name and/or a signature of the second handoff application that are/is locally stored in the second terminal device.

4. The method according to claim 3, wherein when the cloud identification information of the second handoff application comprises the signature of the second handoff application, the method further comprises:

obtaining, by a second authentication service manager, the signature of the second handoff application by using the package name/process name of the second handoff application.

5. The method according to claim 4, wherein the method further comprises:

obtaining, by the second authentication service manager, the signature of the second handoff application by using the package name of the second handoff application when the second handoff application is an application on an Android platform, obtaining, by the second authentication service manager, an installation path of the second handoff application from registry information RegRoot and RegKey by using the process name of the second handoff application, splice a relative path described by "ImagePath" when the second handoff application is an application on a Windows platform, finding a main process of the second handoff application, and reading the signature of the second handoff application.

6. The method according to claim 1, wherein the matching relationship comprises a first matching relationship, and the performing matching relationship verification on the second handoff application comprises:

sending, by the second terminal device, a matching relationship query request to the cloud server, wherein the matching relationship query request carries the APPID of the second handoff application;

receiving, by the second terminal device, the first matching relationship from the cloud server, wherein the first matching relationship is used to indicate at least one application capable of being handed off with the second handoff application; and determining, by the second terminal device based on the first matching relationship, whether the at least one application comprises the first handoff application, to obtain the matching relationship verification result.

7. The method according to claim 1, wherein the matching relationship comprises a first matching relationship, and the performing matching relationship verification on the second handoff application comprises:

sending, by the second terminal device, a matching relationship query request to the cloud server, wherein the matching relationship query request carries the APPID of the first handoff application;

receiving, by the second terminal device, a first matching relationship from the cloud server, wherein the first matching relationship is used to indicate at least one application capable of being handed off with the first handoff application; and determining, by the second terminal device based on the first matching relationship, whether the at least one application comprises the second handoff application, to obtain the matching relationship verification result.

8. The method according to claim 1, wherein the matching relationship comprises a second matching relationship, and the performing matching relationship verification on the second handoff application comprises:

obtaining, by the second terminal device, a second matching relationship, wherein the second matching relationship is used to indicate at least one application capable of being handed off with the second handoff application, and the second matching relationship is locally stored in advance when the second handoff application is installed on the second terminal device; and determining, by the second terminal device based on the second matching relationship, whether the at least one application comprises the first handoff application, to obtain the matching relationship verification result.

9. The method according to claim 1, wherein the method further comprises:

sending, by the second terminal device, a handoff data request message to the first terminal device in response to a tap operation performed by the user on the handoff contact point; and receiving, by the second terminal device, handoff data from the first terminal device, and displaying the handoff data.

10. The method according to claim 9, wherein before the receiving a broadcast handoff notification from the first terminal device, the method further comprises:

determining, by the first handoff application, whether a current handoff scenario is a first valid handoff scenario, wherein the first valid handoff scenario instructs the first handoff application in a started state;

sending, by the first handoff application, a handoff service registration request to a first handoff service manager through a first handoff service SDK when the current handoff scenario is the first valid handoff scenario, where the handoff service registration request carries a UID and an APPID of the first handoff application;

sending, by the first handoff service manager, a first validity authentication request to a first authentication service manager;

determining, by the first authentication service manager, local identification information of the first handoff application based on the first validity authentication request;

receiving, by the first authentication service manager, the cloud identification information of the first handoff application;

determining, by the first authentication service manager, validity authentication on the first handoff application succeeds based on the cloud identification information and the local identification information are the same;

determining, by the first handoff application, handoff service registration of the first handoff application succeeds when the validity authentication result of the first handoff application is that the authentication succeeds.

11. The method according to claim 10, wherein the determining local identification information of the first handoff application based on the first validity authentication request, comprises:

determining, by the first authentication service manager, the local identification information of the first handoff application based on the UID of the first handoff application when the first handoff application is an application on an Android platform, where the local identification information includes the package name and a signature of the first handoff application;

determining, by the first authentication service manager, the local identification information of the first handoff application based on process information of the first handoff application when the first handoff application is an application on a Windows platform, where the local identification information includes a process name and the signature of the first handoff application.

12. The method according to claim 11, wherein after the handoff service registration of the first handoff application succeeds, the method further comprises:

determining, by the first handoff application, whether a current handoff scenario is a second valid handoff scenario, wherein the second valid handoff scenario instructs the first handoff application is in an editing state;

sending, by the first handoff application the broadcast handoff notification to the first handoff service SDK when the current handoff scenario is the second valid handoff scenario.

13. An electronic device to operate as a second terminal device, wherein the electronic device comprises a memory, wherein the memory is configured to store computer instructions, and when the electronic device executes the computer instructions, the electronic device performs the following operations:

receiving, by the second terminal device, a broadcast handoff notification from a first terminal device, wherein the broadcast handoff notification is used to request to hand off a first handoff application on the first terminal device to the second terminal device;

determining, by the second terminal device, a second handoff application based on the broadcast handoff notification;

performing, validity authentication on the second handoff application based on cloud identification information of the second handoff application from a cloud server and local identification information of the second handoff application, to obtain a validity authentication result;

performing, matching relationship verification on the second handoff application based on matching relationship, to obtain a matching relationship verification result, wherein the matching relationship is used to indicate at least one application capable of being handed off with the second handoff application or the matching relationship is used to indicate at least one application capable of being handed off with the first handoff application; and displaying, by the second terminal device, a handoff contact point of the second handoff application when the validity authentication result is that the validity authentication succeeds, and the matching relationship verification result is that the matching relationship verification succeeds, wherein the broadcast handoff notification comprises an application identifier (APPID) of the first handoff application and a handoff policy;

the handoff policy comprises at least one of the following:

a handoff status identifier, a package name or a process name of at least one target handoff application, a device type of the at least one target handoff application, an application market release policy of the at least one target handoff application, and a minimum version that supports handoff; and the at least one target handoff application comprises the second handoff application.

14. The electronic device according to claim 13, wherein when the electronic device executes the computer instructions, the electronic device performs the following operations:

determining, by the first handoff application, whether a current handoff scenario is a first valid handoff scenario, wherein the first valid handoff scenario instructs the first handoff application in a started state;

sending, by the first handoff application, a handoff service registration request to a first handoff service manager through a first handoff service SDK when the current handoff scenario is the first valid handoff scenario, where the handoff service registration request carries a UID and an APPID of the first handoff application;

sending, by the first handoff service manager, a first validity authentication request to a first authentication service manager;

determining, by the first authentication service manager, local identification information of the first handoff application based on the first validity authentication request;

receiving, by the first authentication service manager, the cloud identification information of the first handoff application;

determining, by the first authentication service manager, validity authentication on the first handoff application succeeds based on the cloud identification information and the local identification information are the same;

determining, by the first handoff application, handoff service registration of the first handoff application succeeds when the validity authentication result of the first handoff application is that the authentication succeeds.

15. The electronic device according to claim 14, wherein when the electronic device executes the computer instructions, the electronic device performs the following operations:

determining, by the first authentication service manager, the local identification information of the first handoff application based on the UID of the first handoff application when the first handoff application is an application on an Android platform, where the local identification information includes the package name and a signature of the first handoff application;

determining, by the first authentication service manager, the local identification information of the first handoff application based on process information of the first handoff application when the first handoff application is an application on a Windows platform, where the local identification information includes a process name and the signature of the first handoff application.

16. The electronic device according to claim 15, wherein when the electronic device executes the computer instructions, the electronic device performs the following operations:

determining, by the first handoff application, whether a current handoff scenario is a second valid handoff scenario, wherein the second valid handoff scenario instructs the first handoff application is in an editing state;

sending, by the first handoff application the broadcast handoff notification to the first handoff service SDK when the current handoff scenario is the second valid handoff scenario.

17. The electronic device according to claim 16, wherein the cloud identification information of the second handoff application comprises the signature of the second handoff application, when the electronic device executes the computer instructions, the electronic device performs the following operations:

obtaining, by a second authentication service manager, the signature of the second handoff application by using the package name of the second handoff application when the second handoff application is an application on an Android platform, obtaining, by the second authentication service manager, an installation path of the second handoff application from registry information RegRoot and RegKey by using the process name of the second handoff application, splice a relative path described by "ImagePath" when the second handoff application is an application on a Windows platform, finding a main process of the second handoff application, and reading the signature of the second handoff application.

18. A non-transitory computer-readable storage medium, wherein the computer-readable storage medium stores computer instructions, and when the computer instructions are executed on an electronic device operating as a second terminal device, the electronic device performs the following operations:

receiving, by the second terminal device, a broadcast handoff notification from a first terminal device, wherein the broadcast handoff notification is used to request to hand off a first handoff application on the first terminal device to the second terminal device;

determining, by the second terminal device, a second handoff application based on the broadcast handoff notification;

performing, validity authentication on the second handoff application based on cloud identification information of the second handoff application from a cloud server and local identification information of the second handoff application, to obtain a validity authentication result;

performing, matching relationship verification on the second handoff application based on matching relationship, to obtain a matching relationship verification result, wherein the matching relationship is used to indicate at least one application capable of being handed off with the second handoff application or the matching relationship is used to indicate at least one application capable of being handed off with the first handoff application; and displaying, by the second terminal device, a handoff contact point of the second handoff application when the validity authentication result is that the validity authentication succeeds, and the matching relationship verification result is that the matching relationship verification succeeds, wherein the broadcast handoff notification comprises an application identifier (APPID) of the first handoff application and a handoff policy;

the handoff policy comprises at least one of the following:

a handoff status identifier, a package name or a process name of at least one target handoff application, a device type of the at least one target handoff application, an application market release policy of the at least one target handoff application, and a minimum version that supports handoff; and the at least one target handoff application comprises the second handoff application.

* * * * *